Aug. 10, 1965     D. H. MacKENZIE ETAL     3,199,445
MACHINE FOR REGISTERING A SERIES OF TRANSACTIONS
Original Filed July 27, 1959     14 Sheets-Sheet 1

INVENTORS
DONALD H. MACKENZIE
KENTON D. McMAHAN
JOHN CHERRYBONE
BY
*Beale and Jones*
ATTORNEY

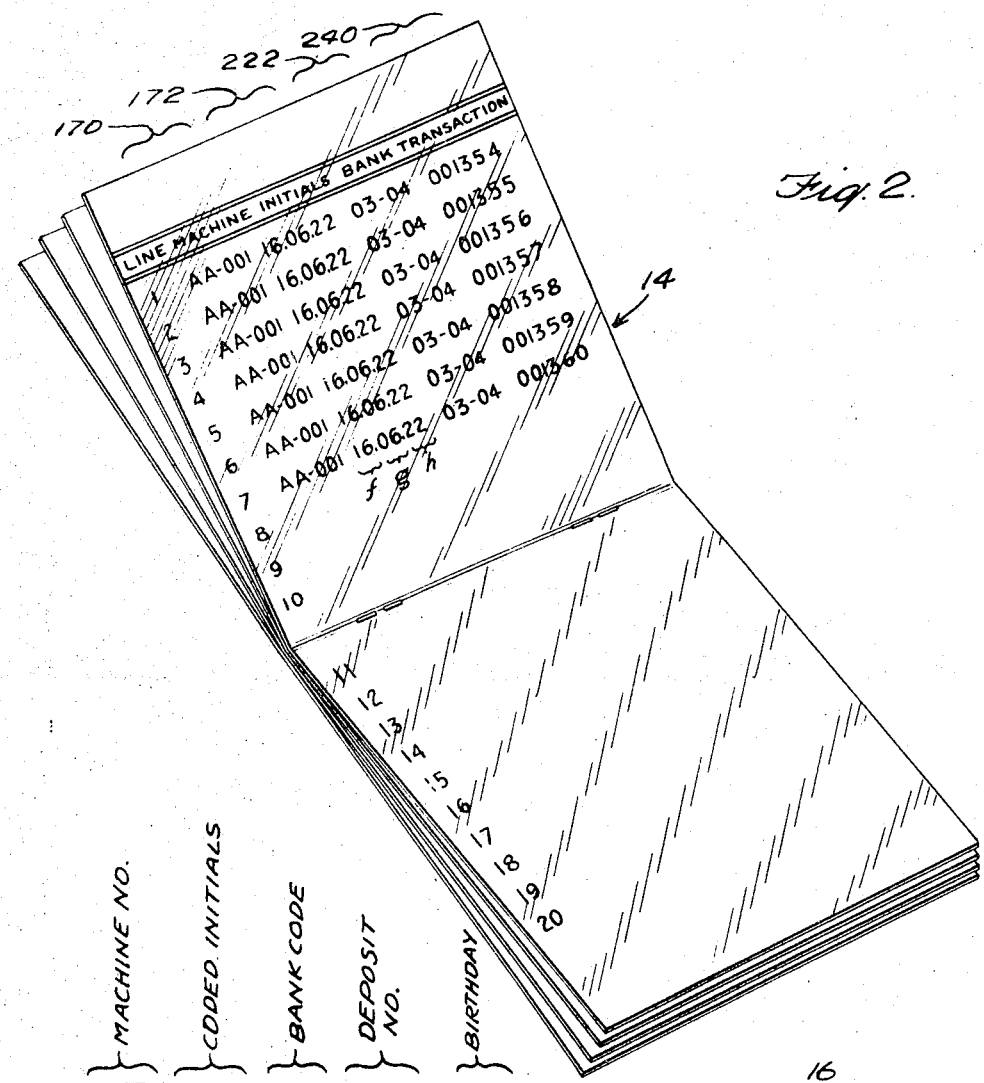

Aug. 10, 1965  D. H. MacKENZIE ETAL  3,199,445
MACHINE FOR REGISTERING A SERIES OF TRANSACTIONS
Original Filed July 27, 1959  14 Sheets-Sheet 3

INVENTORS
DONALD H. MACKENZIE
KENTON D. McMAHAN
JOHN CHERRYBONE
BY Beals and Jones
ATTORNEY

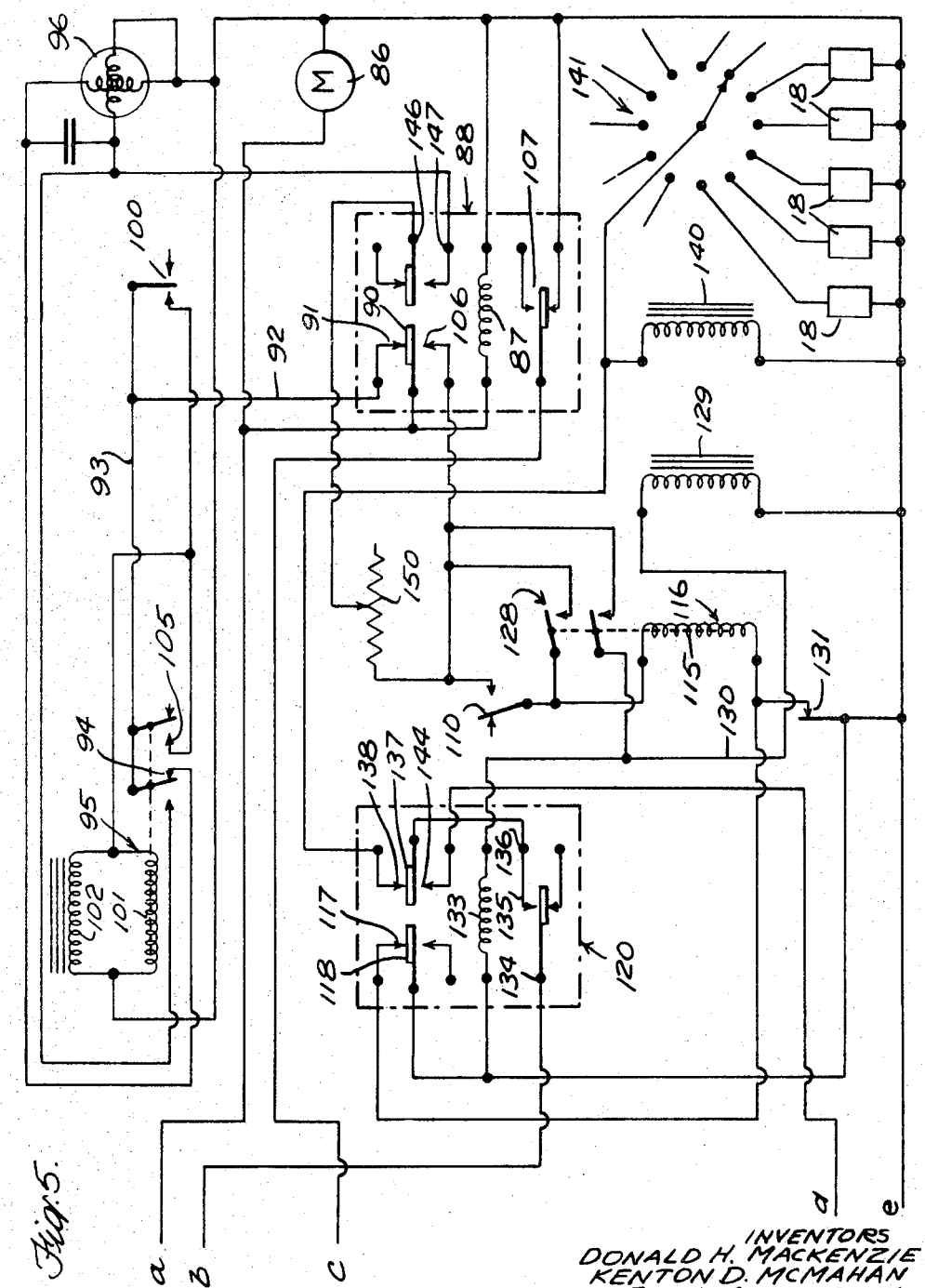

Aug. 10, 1965  D. H. MacKENZIE ETAL  3,199,445
MACHINE FOR REGISTERING A SERIES OF TRANSACTIONS
Original Filed July 27, 1959  14 Sheets-Sheet 5
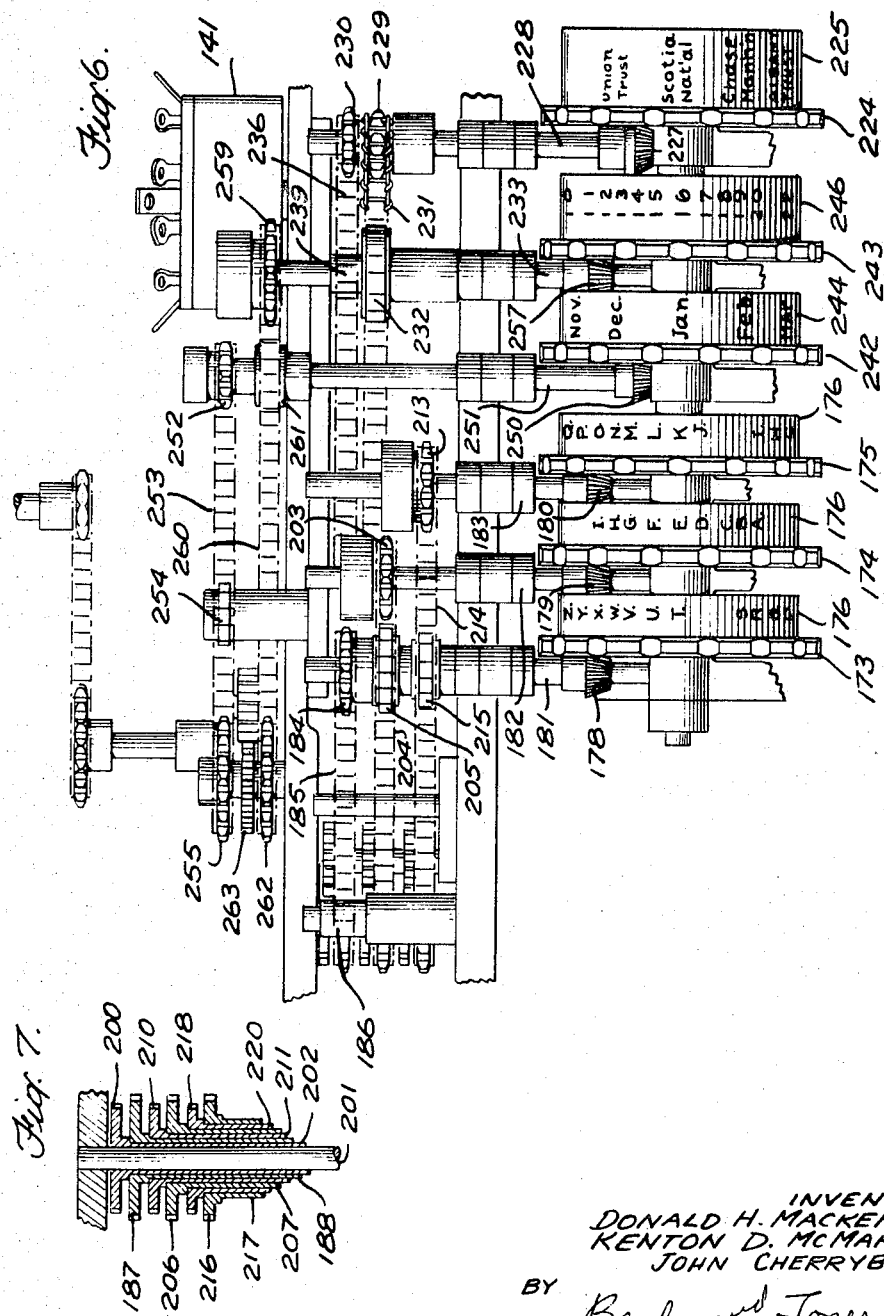
INVENTORS
DONALD H. MACKENZIE
KENTON D. McMAHAN
JOHN CHERRYBONE
BY
Beale and Jones
ATTORNEY

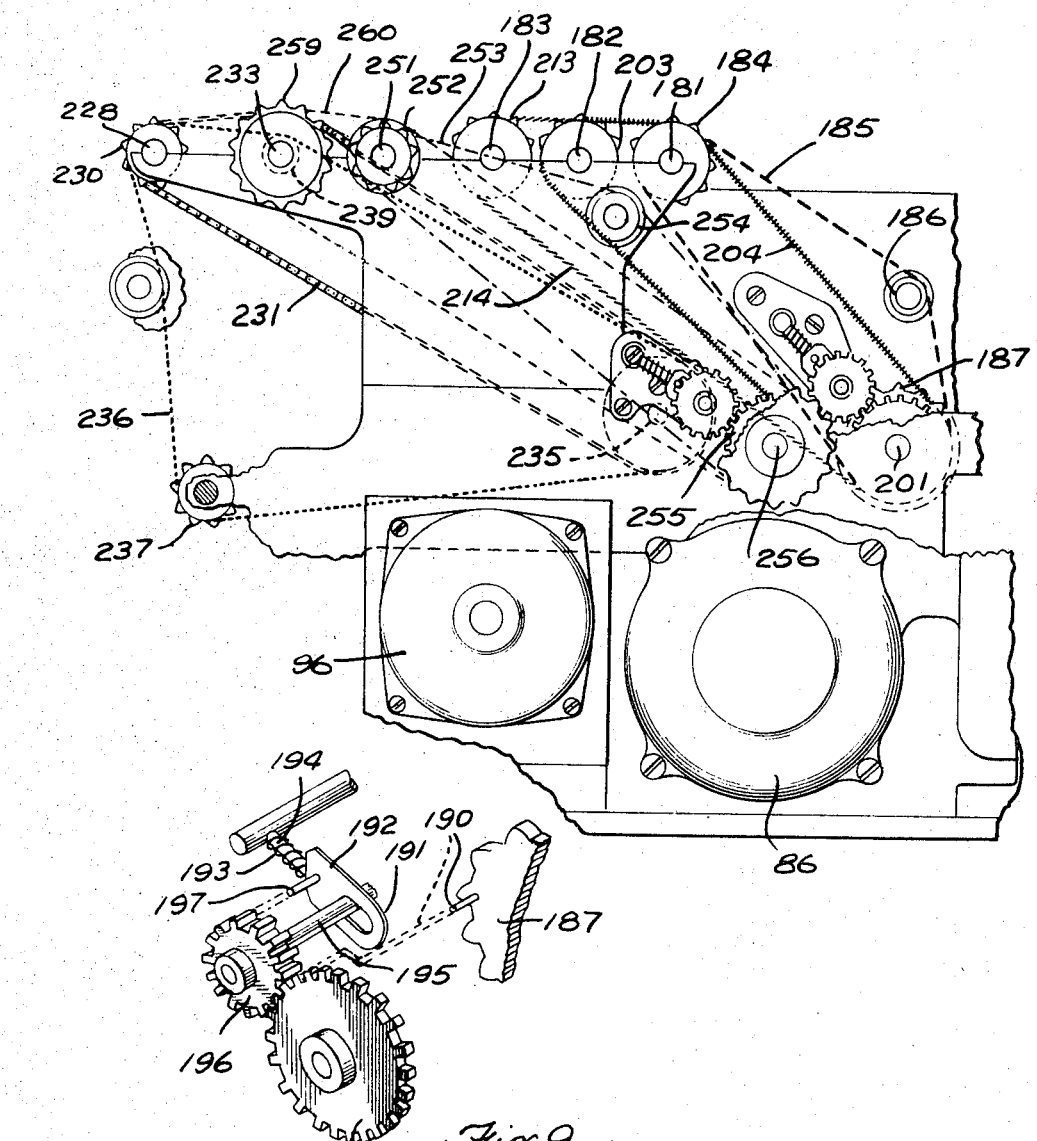

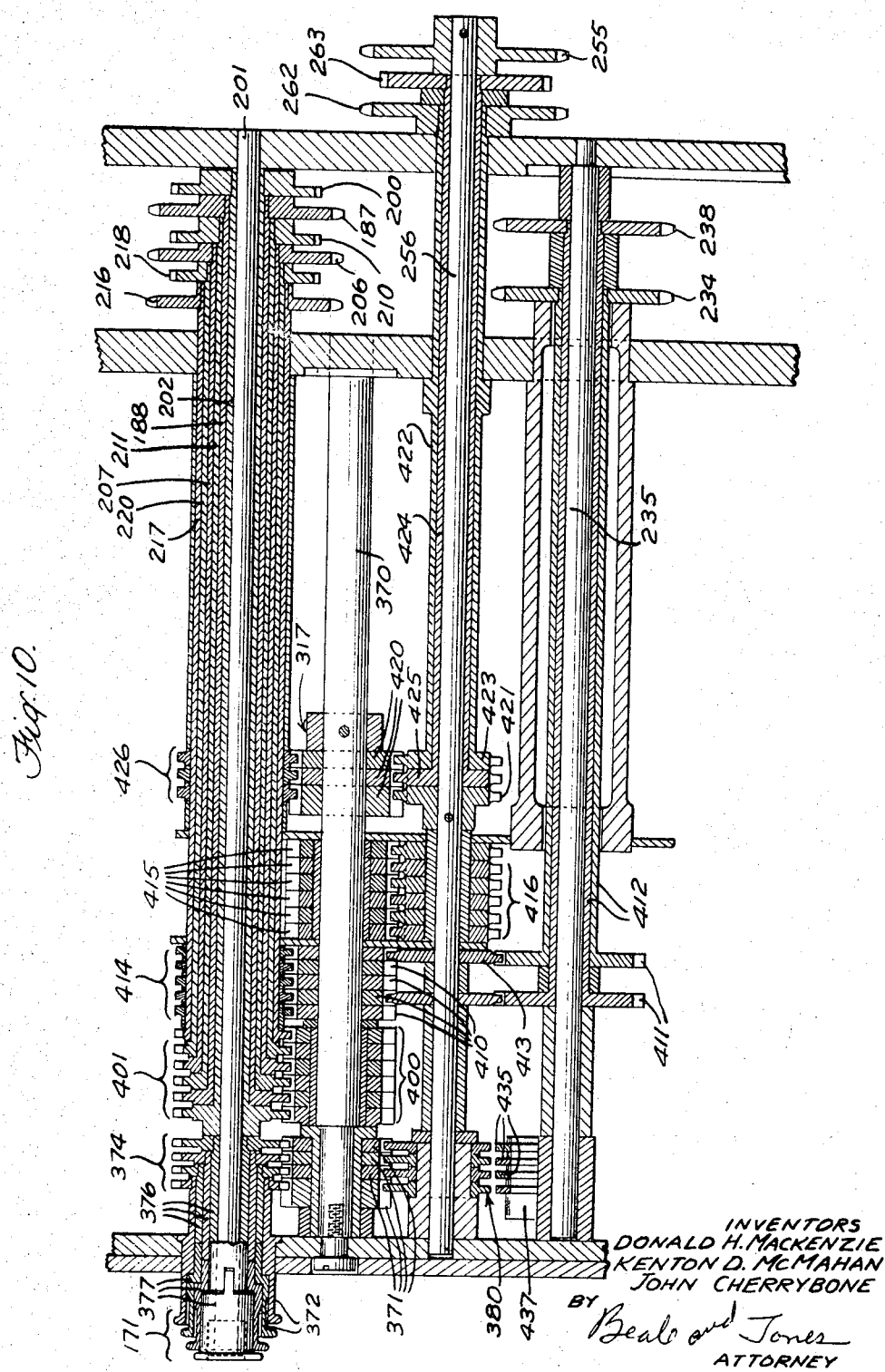

Aug. 10, 1965　　　D. H. MacKENZIE ETAL　　　3,199,445
MACHINE FOR REGISTERING A SERIES OF TRANSACTIONS
Original Filed July 27, 1959　　　　　　　　14 Sheets-Sheet 8
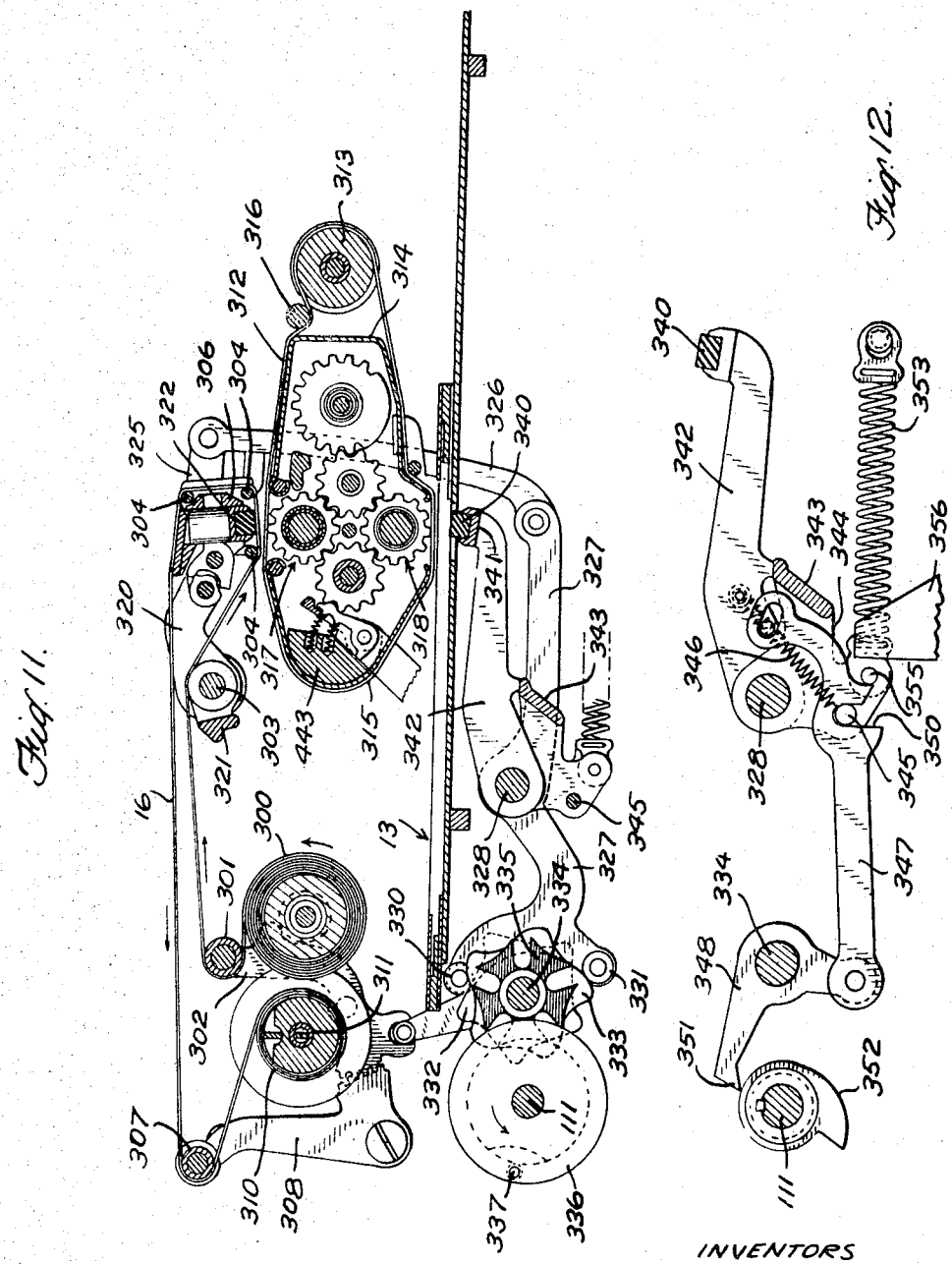
INVENTORS
DONALD H. MACKENZIE
KENTON D. McMAHAN
JOHN CHERRYBONE
BY
Beale and Jones
ATTORNEY

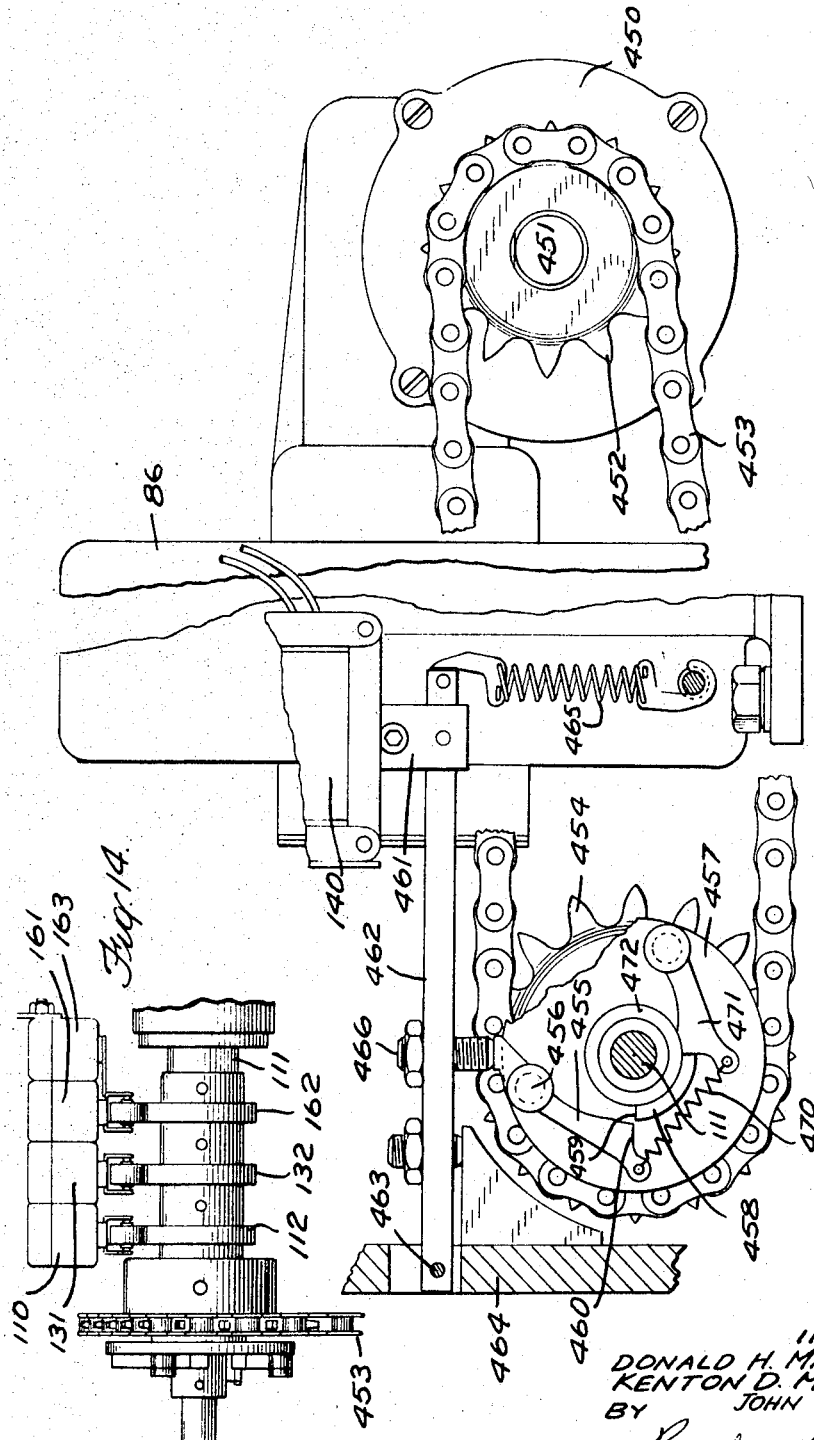

Aug. 10, 1965 D. H. MacKENZIE ETAL 3,199,445
MACHINE FOR REGISTERING A SERIES OF TRANSACTIONS
Original Filed July 27, 1959 14 Sheets-Sheet 10

INVENTORS
DONALD H. MACKENZIE
KENTON D. McMAHAN
JOHN CHERRYBONE
BY
Beale and Jones
ATTORNEY INVENTORS
DONALD H. MACKENZIE
KENTON D. McMAHAN
JOHN CHERRYBONE
BY Beale and Jones
ATTORNEY

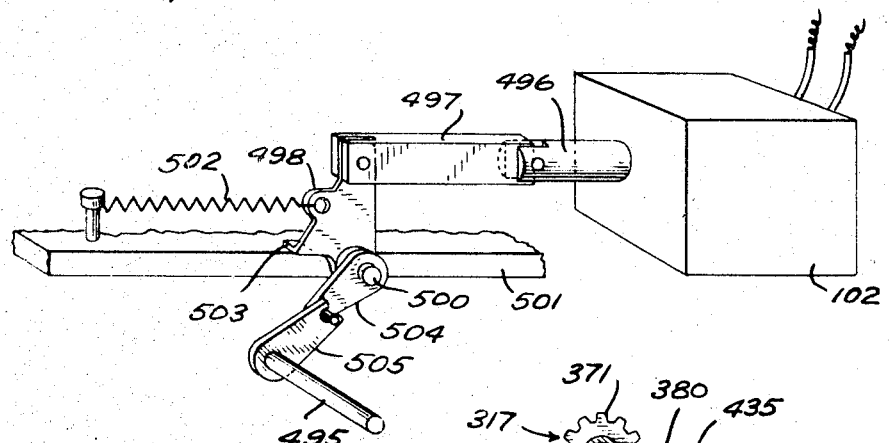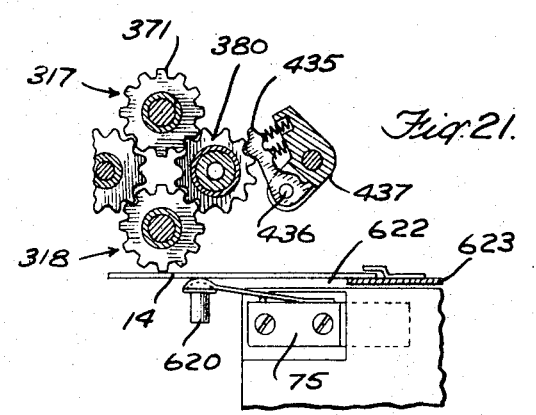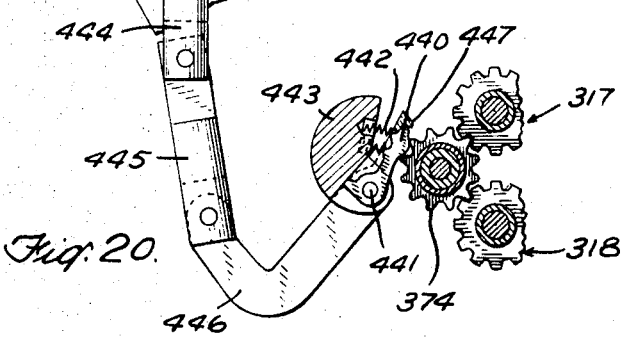

Aug. 10, 1965         D. H. MacKENZIE ETAL         3,199,445
MACHINE FOR REGISTERING A SERIES OF TRANSACTIONS
Original Filed July 27, 1959                14 Sheets-Sheet 13
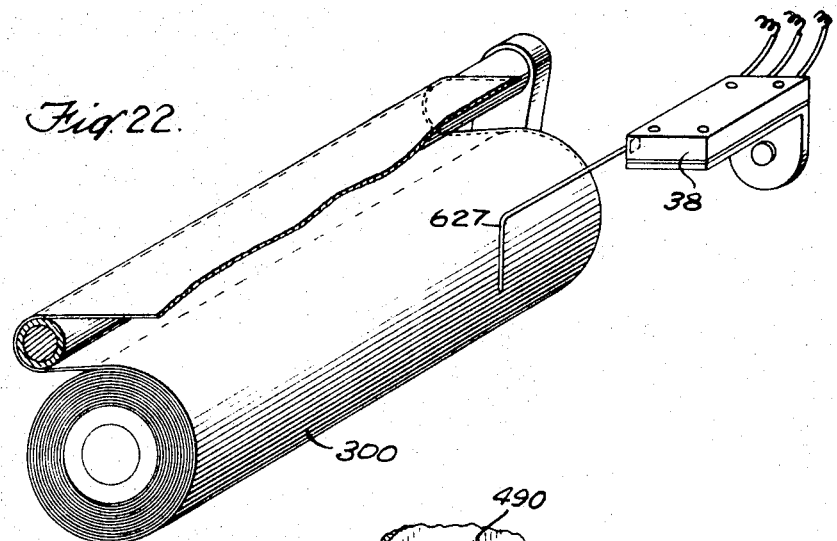
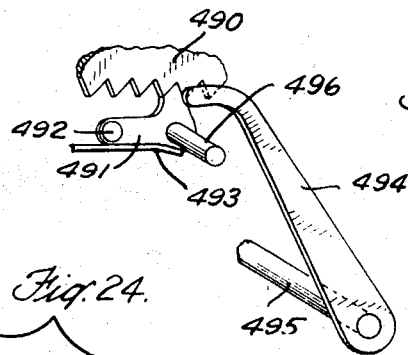
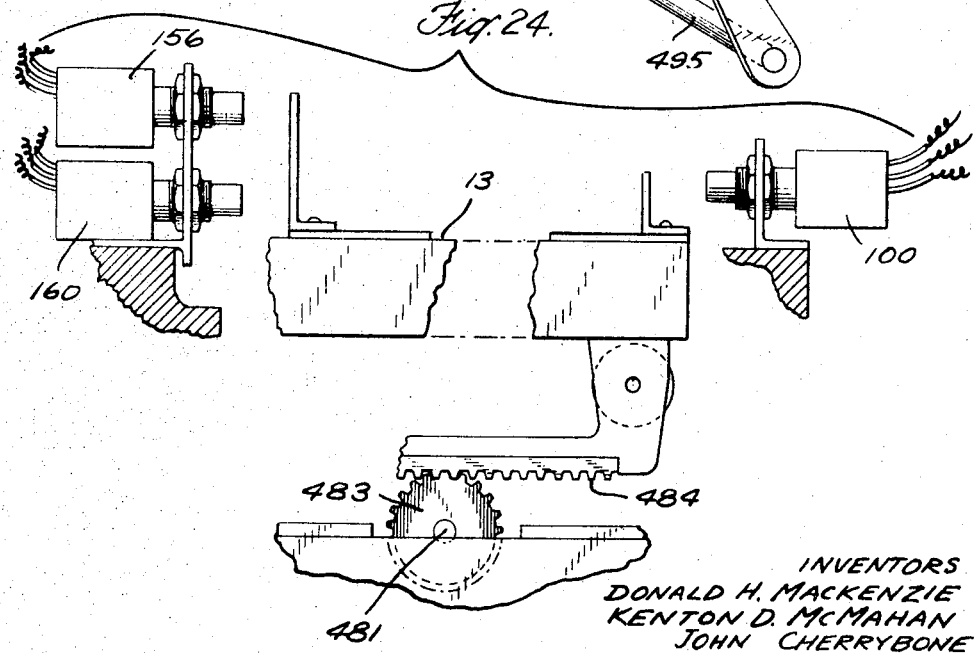
INVENTORS
DONALD H. MACKENZIE
KENTON D. McMAHAN
JOHN CHERRYBONE
BY
Beale and Jones
ATTORNEY Aug. 10, 1965  D. H. MacKENZIE ETAL  3,199,445
MACHINE FOR REGISTERING A SERIES OF TRANSACTIONS
Original Filed July 27, 1959  14 Sheets-Sheet 14
Fig. 25.
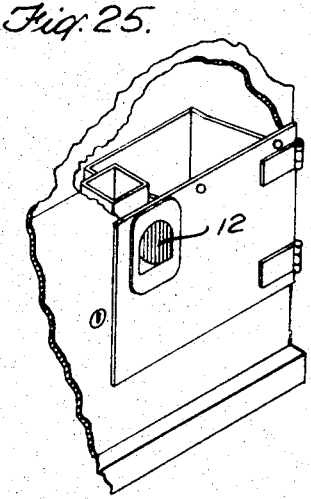
Fig. 26.
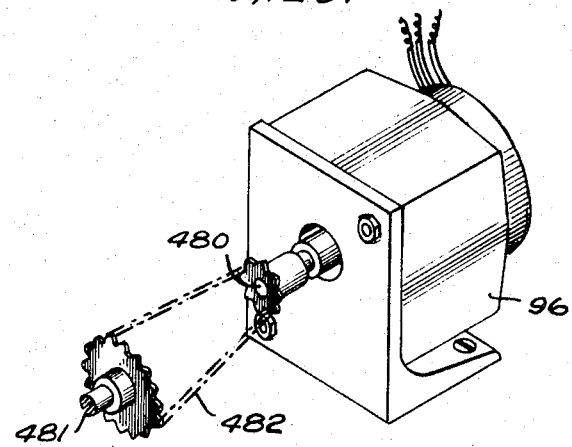
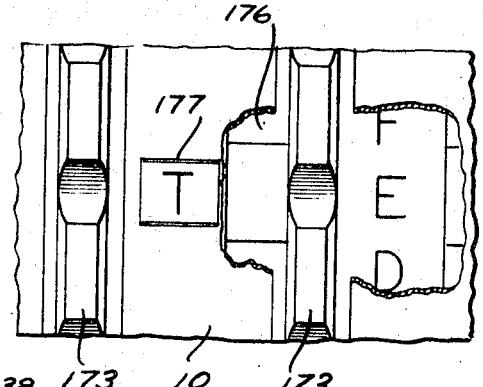
Fig. 27.
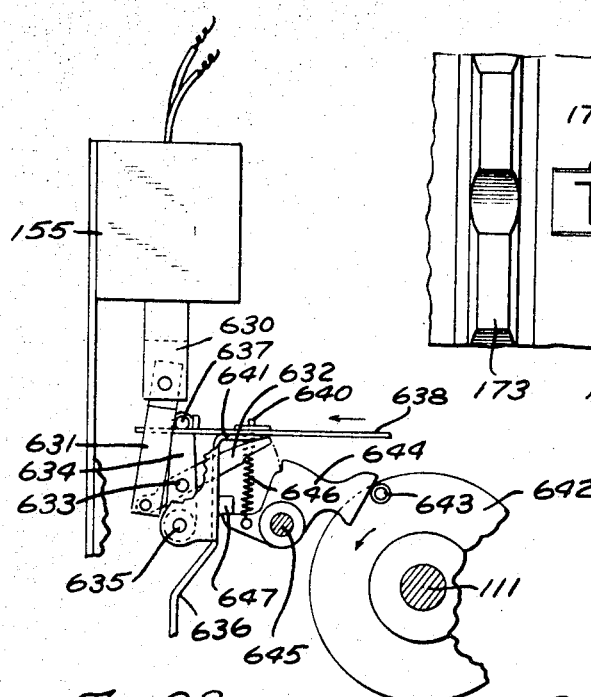
Fig. 28.
INVENTORS
DONALD H. MACKENZIE
KENTON D. McMAHAN
JOHN CHERRYBONE
BY Beals and Jones
ATTORNEY

United States Patent Office 3,199,445
Patented Aug. 10, 1965

3,199,445
MACHINE FOR REGISTERING A SERIES OF TRANSACTIONS
Donald H. Mackenzie, 465 W. 23rd St., New York 11, N.Y., and Kenton D. McMahan, Scotia, and John Cherrybone, Roslyn Heights, N.Y.; said McMahan and said Cherrybone assignors to said Mackenzie
Original application July 27, 1959, Ser. No. 829,872, now Patent No. 3,169,623, dated Feb. 16, 1965. Divided and this application Apr. 23, 1964, Ser. No. 371,864
9 Claims. (Cl. 101—90)

This application is a division of application Serial No. 829,872, filed July 27, 1959, and issued as U.S. Patent 3,169,623 on February 16, 1965.

The present invention relates to a cash register and although it has a wide range of utility, it is particularly useful as a register in connection with a bank saving system.

One object of the present invention is to provide a new and improved register.

Another object of the present invention is to provide a new and improved register, which can be safely operated by the depositor without the assistance of a bank teller or anyone else, thereby permitting it to be unattended in easily accessible and conspicuous locations, such as offices, factories, department stores, supermarkets and other public places, so that the savings of monies in small amounts and increments, which otherwise would not be accumulated for deposit in the regular way in a bank, are facilitated and encouraged.

In accordance with certain features of the present invention, the coin depository and register is designed to receive coins of different denominations in any combination and sequence and operates to automatically count and add the deposited coins and record them in a passbook and on a record strip or tape in the machine automatically in successive units or increments of predetermined value. For example, the specific embodiment of the invention contemplated receives nickels, dimes and/or quarters in any order, but records them in the passbooks and record tape in units of quarters automatically as successive transactions.

As another feature of the present invention, the register is designed for simultaneous use by a number of banks, the machine being provided with a selecting device by which the depositor can set up the necessary mechanism for counting the money deposited on behalf of the selected bank and for indicatively relating the transaction recorded on the record strip to the selected bank.

As a further feature of the invention, the register is provided with a coding mechanism for translating certain selected data identifying the depositor to corresponding designations in the printing mechanism to afford secrecy and to permit the bank to confirm the deposit. For example, the selector may be marked with letters by which the depositor may lay out the initials of his name and the coding mechanism translates this identifying data in the printing machine into terms of different corresponding symbols such as numbers, so that the initials are records in this coded form in the passbook and the record tape.

As another feature of the present invention, means are provided for selecting a line on the passbook on which the selected transaction and data are printed and for moving this passbook in successive increments corresponding to the space between the lines, for printing on successive lines thereafter automatically according to the amount of money deposited and/or the number of transactions to be recorded.

Various other objects, features and advantages of the invention are apparent from the following description and from the accompanying drawings, in which:

FIG. 2 is a perspective on an enlarged scale of the passbook which is employed in conjunction with the machine of the present invention and which is shown with recorded data therein;

FIG. 3 is a face view of a section of the record tape which is employed in conjunction with the machine of the present invention and which is shown with recorded data therein;

FIG. 5 is the other half of the wiring diagram of the machine with wires $a$, $b$, $c$, $d$ and $e$ constituting continuations of the wires correspondingly lettered in FIG. 4;

FIG. 6 is a top plan view of the selector dial system, gear and sprocket drive for setting the print wheels;

FIG. 7 is a detailed section of the gear and sprocket tube drive for the depositor's initial code print wheels;

FIG. 8 is a rear view of the sprocket drive mechanism shown in FIG. 6 with fragmentary sections of the main print and carriage drive motors;

FIG. 9 is a detail exploded perspective of a tens print wheel operating mechanism and lock;

FIG. 10 is a horizontal section through the upper set of print wheels shown with their tube and sprocket drives;

FIG. 11 is vertical section through the printing mechanism, the mechanism for supporting the record tape mechanism and the mechanism by which impressions from the upper set of print wheels are made on the record tape cyclically;

FIG. 12 is a side elevation partly in section of the drive mechanism by which impressions from the lower set of print wheels are made on the record tape;

FIG. 13 is a front view of the main chain sprocket drive for the print shaft and the solenoid clutch mechanism operable in conjunction therewith;

FIG. 14 is a top plan view of the main clutch drive with various switches cam operated from the print shaft;

FIG. 15 is a fragmentary front view with parts broken away to show the interior structure of the carriage mechanism by which the carriage is moved step by step automatically to print on successive lines of the record material;

FIG. 19 is a perspective view of the carriage release solenoid mechanism;

FIG. 20 is a side view of the solenoid operated print wheel aligning and locking mechanism;

FIG. 21 is a detail section view showing the passbook switch and surrounding structure;

FIG. 22 is a perspective view of the tape supply roll and switch device;

FIG. 23 is a fragmentary perspective view of the carriage release pawl and operating finger mechanism;

FIG. 24 is fragmentary view of the carriage showing limit switches and motor drive means;

FIG. 25 is a fragmentary perspective view of the coin box and return cup;

FIG. 26 is a perspective view of the carriage motor and the chain sprocket drive;

FIG. 27 is a fragmentary enlarged view of the two initial selector dials; and

FIG. 28 is a side view of the solenoid controlled passbook ejecting mechanism.

*General description and operation of the machine*

Figure 1:
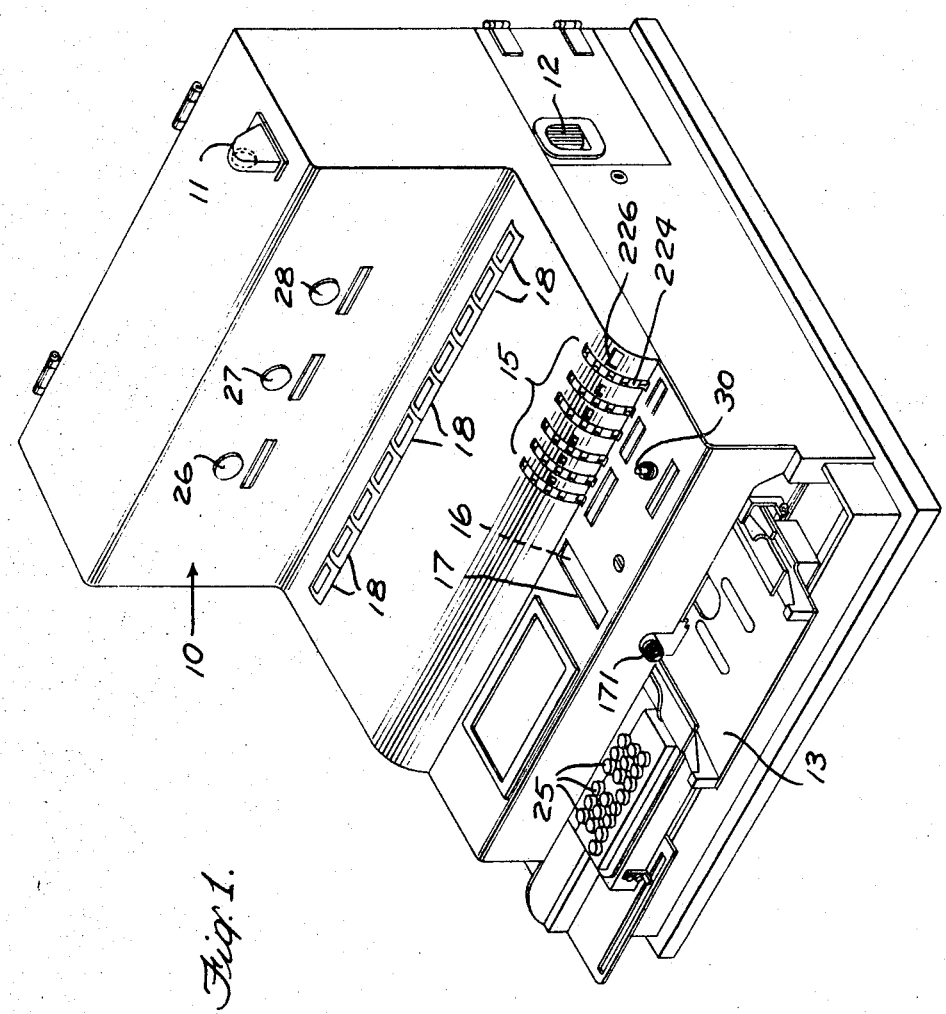
FIG. 1 is a perspective of the register machine embodying the present invention.

The machine shown in FIG. 1 includes a cover 10 and comprises in general a coin insert 11 with a coin return 12 (FIGS. 1 and 25), a carriage 13 to receive a depositor's passbook 14 (FIG. 2) with numbered line spaces and a dial system 15 by which certain identifying and recording data may be set up in a printing mechanism by the depositor and a specific bank of a group participating in the use of the machine may be selected. The printing mechanism which is inside the cover 10, enters on the passbook 14 supported on the carriage 13, the pertinent data and also prints similar data on a record strip or tape 16 (FIGS. 1 and 3) exposed in successive linear increments through a window 17 in said cover.

A series of counters 18 exposed through windows in the cover 10 correspond to the banks respectively participating in the use of the machine and serve to count the deposited money allotted to any one bank. Only that transaction is set into operation for any one transaction which corresponds to the bank selected by the depositor on the dial system 15.

A bank of line selector buttons 25 permits the depositor to select the line on his passbook 14 in which the deposit is to be initially entered. By pressing the required selector button 25, the carriage 13 supporting the passbook 14 will move until the selected line in said passbook is in registry with the printing line of the printing mechanism.

A signal tape light 26 when lit indicates that the record tape supply is depleted, a signal line light 27 when lit indicates that the depositor has failed to press the necessary line selecting button 25 and a signal book light 28 when lit indicates that the depositor has failed to place his passbook 14 on the carriage 13.

A print switch button 30 is mechanically operated by the depositor to permit the printing mechanism to operate. The machine operates automatically, so that any number of coins within a prescribed limit of predetermined denominations may be inserted into the coin insert 11, counted by the machine, and their value divided into transaction units of predetermined value. The machine operates automatically, to print the records of these transaction units as successive entries into the passbook 14 and on the record tape 16. For example, the machine may be designed as it is in the present embodiment, to handle nickels, dimes and quarters. If, for example, these coins in any combination and order and amounting to a dollar are deposited in the machine, the machine automatically adds the coins and divides them into four transaction units, each amounting to a quarter. The machine will store the data corresponding to the four transactions and operate the machine automatically through four successive cycles to enter the transactions on four successive lines of the passbook 14 and of the record tape 16, each corresponding to a deposit of 25¢. Only the initial entry line is selected by the depositor through the operation of the pertinent line selector button 25, the carriage 14 moving step by step through the other three succeeding line spaces automatically as the stored transaction data are successively translated into printing operations.

*The electrical wiring system*

Figure 4:
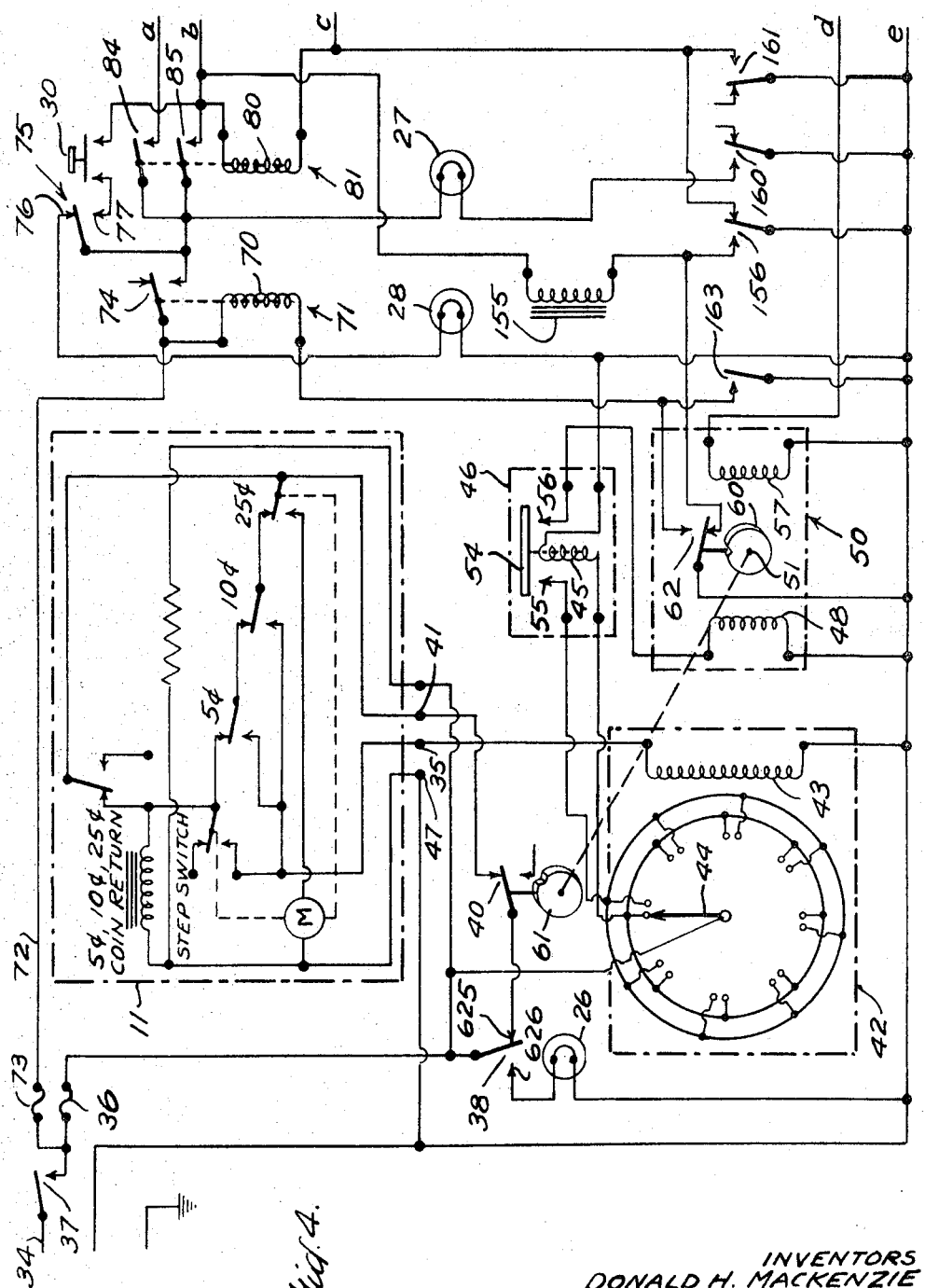
FIG. 4 is one half of the wiring diagram for the machine with wires terminating at $a$, $b$, $c$, $d$ and $e$ on the sheet.
Figure 16:
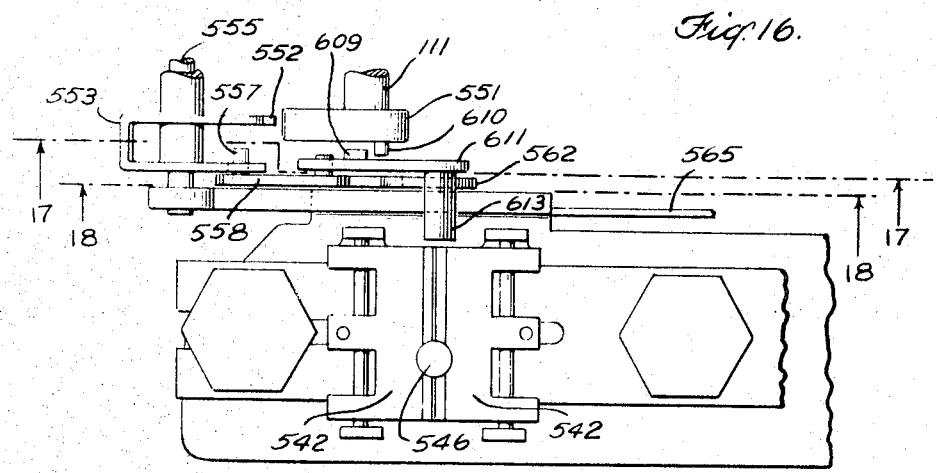
FIG. 16 is the top plan view of part of the carriage supporting mechanism and part of the mechanism for operating the carriage step by step.
Figure 17:
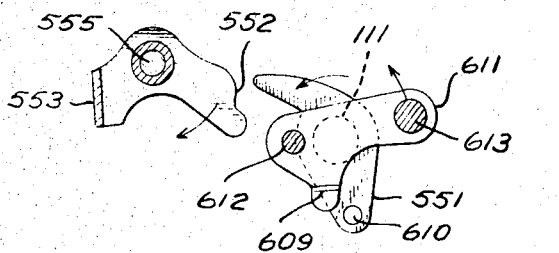
FIG. 17 is a detail section of the mechanism for operating the carriage step by step taken on lines 17—17 of FIG. 16.
Figure 18:
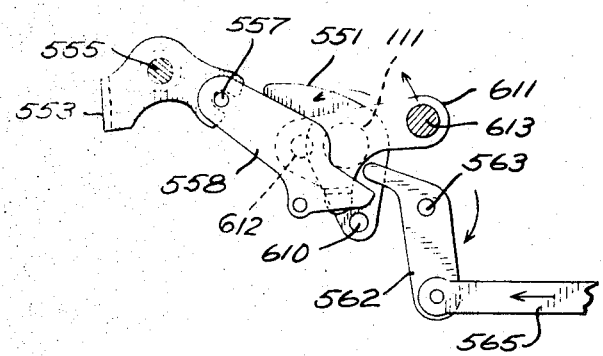
FIG. 18 is a detail section of the mechanism for operating the carriage step by step taken on lines 18—18 of FIG. 16.

FIGS. 4 and 5 show the general electrical system for operating the machine of the present invention. The system is as follows:

The coin mechanism 11, per se, is of well known electrical type, as for example. that made by National Rejector Inc. and classified as #7201 and contains the required switch contacts and bad coin rejector mechanism. The specific coin mechanism 11 shown handles any combination of nickels, dimes and quarters in any sequence and produces a predetermined number of electric impulses corresponding in number to the value of coins of different denominations deposited therein. For example, in the specific form of coin mechanism 11 employed in the present embodiment, this coin mechanism produces a momentary impulse on terminal 35 for each 5¢ coin value deposited, so that there is produced one impulse for a nickel deposit, two impulses for a dime deposit and five impulses for a quarter deposit. The coin mechanism 11 for the purpose described may be of the type shown in U.S. Patent 2,586,129.

In the specific embodiment of the electrical system shown in FIGS. 4 and 5, power from a line 34 enters through a lock switch 37, a 5 ampere fuse 36, a signal tape switch 38, and a normally closed switch 40 to a terminal 41 on the coin mechanism 11. This power energizes the coin mechanism 11 and produces a momentary impulse on terminal 35 for each 5¢ coin value deposited, as described. This impulse then energizes the coil of a stepping relay 42 which, per se, is well known and it may be of the PC type manufactured by the Guardian Electric Mfg. Co. This stepping relay 42 is an automatic counting device through which a progressive and sequential operation or actuation is accomplished by a series of controlled electric impulses. Each electric impulse from the coin mechanism 11 is fed into a stepping magnet 43 causing a pawl (not shown) to engage a ratchet (not shown) and rotate the ratchet a given number of degrees, thus completing one step. This action rotates an armature 44 one step corresponding to a 5¢ coin value. Connected to this armature 44 is a commutator switching dial so connected that each 4th, 9th, 14th, 19th, etc. step corresponding to a coin value of 20¢, 45¢, 70¢, 95¢ and so forth, closes a contact to energize the pick-up solenoid coil 45 of the open 5th, 10th, 16th, etc. contact segment of relay 42 through add coil 48 of relay 50 to line time delay relay 46 and thereby closes contacts between a terminal 47 of the coin mechanism 11.

Upon receipt of the 5th, 10th, 15th, etc. 5¢ coin value impulses, the armature 44 of the stepping relay 42 advances one step and in so doing deenergizes the coil 45 of the time delay relay 46 and shunts the circuit through the still closed contacts to energize the add coil 48 of a relay 50 for storing units of impulses, each corresponding to a value of 25¢, and to move thereby its armature 51 one step forward.

The time delay relay 46, per se, is well known, and is of the instantaneous make-slow break type, such as that made under the name Agastat type NE-21, and comprises a pneumatic timing head, a solenoid assembly, and a switch. A diaphragm and cap encases the head in which the air used for timing is recirculated. Upon energization of the relay coil 45, the switch is immediately closed and upon deenergization of said coil, there is a delay before the switch opens.

In the form shown, the solenoid coil 45 of the time delay relay 46 is energized when the armature 44 of the stepping relay 42 advances to the 4th step, 9th step, 14th step and so forth corresponding to a deposit of 20¢, 45¢, 70¢ and so forth. This energization of the solenoid coil 45 moves the armature bar 54 of the relay 46 across contacts 55 and 56 of the relay into the circuit of the add coil 48 of the units storing relay 50, but does not energize this add coil because the dial in the stepping relay 42 is not connected at that phase to the power line 34. In the next step of the armature 44 which will be the 5th, 10th, 15th, etc. of said armature, the dial of said armature will be connected to the power line 34 and the solenoid 45 of the time delay relay 46 will be deenergized, but due to the slow break characteristics of this relay, the armature bar 54 of said relay will still extend across the contacts 55 and 56 of the relay and therefore connect the add coil 48 of the unit storing relay 50 to said power line, energizing said add coil.

This will cause the armature 51 controlled by the add coil 48 to rotate forward one step.

The units storing relay 50 is, per se, of well known construction and comprises the add magnet 48 and a subtract magnet 57, each impulse through the add magnet, causing the armature 51 to rotate forwardly one step through a pawl and ratchet control and each impulse through the subtract magnet causing the armature to rotate in the reverse direction one step through a pawl and ratchet control.

On the shaft of the armature 51 of the units storing relay 50 are two cams 60 and 61. One cam 60 operates a switch 62 in the circuits of the printing and passbook carriage mechanisms to be described and the other cam 61 through the switch 40 controls the connection of the terminal 41 of the coin mechanism 11 to the power line 34. The cams 60 and 61 initially, before the insertion of coins in any one complete deposit operation or run, are in positions shown in the wiring diagram of FIG. 4, the cam 60 at this phase having its low region controlling the switch 62 into position to open the circuit to the print and carriage mechanism to be described, while the cam 61 is just one step in advance of the cam 60 with its low region one step beyond position to control the switch 40, so that the terminal 41 of the coin mechanism 11 is connected to the power line 34. The armature 51 of the units storing relay 50 has the capacity to operate through a predetermined number of steps for a complete revolution, the number of steps in a specific embodiment being 40. However, the cams 60 and 61 operate only through an angle just one step short of a complete revolution, for the reasons to be described, so that the number of impulse units that can be stored by the units storing relay 50 in the specific embodiment shown is 39, corresponding to a deposit having a value of 39 quarters. The cam switch 40 maintains the circuit to the terminal 41 of the coin mechanism 11 closed from just prior to the receipt of the first impulse and during receipt of the subsequent successive impulse units and the cam switch 62 closes the circuit to the passbook carriage control mechanism and to the printing control mechanism after receipt of the first impulse unit and maintains this condition until the last impulse unit (39th in the specific embodiment) is received.

On receipt of the last impulse unit (39th of the specific embodiment) just one step prior to the complete revolution of the armature 51 in the units storing relay 50, the low part of the cam 61 moves into position to operate the switch 40 and to open the circuit to the terminal 41 of the coin mechanism 11, thereby preventing said mechanism from accepting any more coins until the subtracting operation of the relay 50, controlled by the operation of the passbook carriage and print mechanism through successive unit cycles has restored the cam 61 back into position in which the high part of said cam controls switch 40.

The cam 60 rotating forwardly does not complete its one revolution, but is limited in its rotation to a position one step short of this revolution, by the opening of the switch 40 to the terminal 41 of the coin mechanism 11 as described. After the receipt of the first impulse unit, the switch 62 is shifted by the high part of the cam 60 into the circuit of the passbook carriage control and printing mechanism control and remains in the circuit until the cam 60 is returned to the position shown in FIG. 4.

The closed contact on switch 62 after receipt of the first impulse, serves to energize the coil 70 of a relay 71 from a main power line 72 through a 10 ampere fuse 73 and closes thereby the switch 74 of said relay. A book switch 75 (FIGS. 4, 15 and 21) makes contact with a terminal 76 of said switch in the absence of a passbook on the carriage 13, as shown in FIG. 4, and upon insertion of coins in the coin mechanism 11, the closing of the relay switch 74 as described and the failure of the switch 75 to be shifted from the position shown in FIG. 4 in the absence of the passbook 14 on the carriage, causes the book lamp 28 (FIGS. 1 and 4) to light up and to give notice to the depositor that he has failed to place his passbook on the carriage. A passbook properly on the carriage 13 for proper entry therein will depress the switch 75 in a matter to be described and cause the switch to make contact with a terminal 77. Thereby, upon energization of the relay coil 70 and consequent closing of the switch 74, the mechanical pressing of the print switch button 30 (FIGS. 1 and 4) with passbook in position to close the contact will energize the coil 80 of a motor relay 81 and close relay switches 84 and 85, thereby holding the coil 80 energized even though the print switch button 30 is released into open position. The closing of the switches 84 and 85 will energize a print motor 86 (FIG. 1, 8 and 13) which controls the printing of the selected data on the passbook 14 and the record tape 16 on successive line spaces in accordance with the number of units or increments each valued at a quarter which has been stored. The conditions described not only starts the operation of the print motor driving the printing mechanism but energizes the coil 87 of a carriage time delay relay 88. At the same time, current passes through the contacts between terminals 90 and 91 of the carriage time delay relay 88 which are normally closed and which remain closed for a predetermined delay period after energization of the relay coil 87. From these closed terminals 90 and 91, the current passes through lines 92 and 93 and through the closed contact of terminal 94 of a switch of a carriage relay 95 to energize a reversible motor 96 by which the carriage 13 supporting the passbook is moved. This moves the carriage 13 to the right, (FIGS. 1, 15 and 24) from its last operating position and starts its search for the new line keylocked position as indicated by the depressed line selector button or key 25. If the new locking position of the carriage 13 is to be to the left of the carriage starting position, the carriage 13 would move all the way to the right until it strikes a limit switch 100 closing said switch. This energizes the coil 101 of the carriage relay 95 and at the same time a carriage solenoid 102, which controls a carriage escapement dog 491 (FIGS. 15 and 23) locking the carriage and which releases the carriage 13 for movement from right to left. The energization of the carriage relay coil 101 opens the contact of terminal 94 and closes the contact of terminal 105, thereby reversing the carriage motor 96 and causing said carriage to move from right to left until the line keylocking position is located. After a predetermined time delay sufficient to allow the carriage 13 to be set, the contacts between terminals 90 and 91 in the carriage time delay relay 88 open up and the contacts between terminals 90 and 106 in said relay close.

The carriage time delay relay 88, per se, is of the well-known, slow make-instantaneous break type providing a two step delay, the first delay interval involving the terminals of a switch 107, the second delay interval involving another set of contact terminals to be described. The relay 88 may, for example, be of the type known as Agastat Net 16. The switch 107 is normally closed and in the circuit of the motor relay coil 80 (FIG. 4) and is opened after an initial delay period in response to energization of the relay coil 87, for the purpose to be made apparent. The other set of contact terminals of the relay 88 to be described are shifted over after a second delay interval subsequent to energization of the relay coil 87.

A motor sprocket switch 110 (FIG. 5) is normally opened and closes momentarily upon rotation of a motor sprocket (FIG. 5) driven from the print motor 86, which also drives a release clutch to be described and which operates cyclically through a print shaft 111 the platens of the printing mechanism by which the record tape 16 and the passbook 14 are pressed against the print wheels through an ink ribbon, as will be described. A cam 112 (FIG. 14) mounted on a sleeve (not shown) which is attached to the sprocket 454 and which is loosely mounted on the print shaft 111, closes the motor sprocket switch 110 momentarily at the correct position of said sprocket to initiate the printing cycle. The closing of the contacts between terminals 90 and 106 (FIG. 5) in the carriage delay relay 88 and the closing of the motor sprocket switch 110, energizes the coil 115 of a print reset relay 116 through normally closed contacts between terminals 117 and 118 of a print time delay relay 120 of the two step delay slow make-instantaneous break type similar to that of the carriage time delay relay 88.

The energization of the coil 115 in the print reset relay 116 through the normally closed contacts of the terminals 117 and 118 of the print time delay relay 120, closes the double switches 128 in the relay 116 and energizes not only an aligning solenoid 129 through a line 130, but also coil 133 of the print time delay relay 120. This aligning solenoid 129 shown more fully in FIG. 20, serves to both center and lock the drive gear which meshes with both upper print wheels printing on the record tape 16 and the lowest print wheels printing on the passbook 14, as will be described more fully hereinafter.

In the circuit of the relay coil 115 in parallel with the terminals 117 and 118 of the print time delay relay 120 is a print shaft switch 131 which is normally opened and which is operated from a cam 132 (FIG. 14) on the print shaft 111, and closed thereby as the print shaft starts to rotate. This switch 131 stays closed until the end of one revolution of the print shaft 111 corresponding to one line printing operation derived from the release of a unit pulse from the units storing relay 50 (FIG. 4), whereupon the switch opens in preparation for the next line printing operation derived from the next unit released from said relay. The closing of the print shaft switch 131 holds the coil 133 of the print time delay relay 120 energized to the end of the print shaft rotation after contact between the terminals 117 and 118 has been opened.

As previously pointed out, the print time delay relay 120 is similar to the carriage time delay relay 88 and provides for a two step delay, the first delay being initiated upon energization of the coil 133 and causing after the requisite period of delay the closing of contacts between terminals 134, 135 and 136. The closing of the contacts between the terminals 134, 135 and 136, produces a momentary closed circuit through the still closed contacts 137 and 138 of the print time delay relay 120, and an electrical impulse to a print solenoid 140 and by means of a dial switch 141 (FIGS. 5 and 6), one of the several bank counters 18 (see also FIG. 1) is selected from the dial system 15 as already described. Energization of the print solenoid 140 momentarily engages the clutch between a print motor drive sprocket and the print shaft 111, as shown more fully in FIG. 13, and as will be more fully described hereinafter, to allow said print shaft 111 to be driven for one complete revolution corresponding to one unit stored in the units storing relay 50 (FIG. 4). At the completion of one revolution of the print shaft 111, the print shaft switch 131 (FIG. 5) opens up as described and drops out the print reset relay 116. During the printing operation performed by the foregoing one revolution of the print shaft 111, the contacts between the terminals 137 and 144 in the print time delay relay 120 close after the lapse of a second delay period subsequent to the first delay period previously referred to, causing the subtract coil or magnet 57 (FIG. 4) in the units storing relay 50 to be energized, and the armature 51 with the cams 60 and 61 connected for rotation therewith, to be turned back one step. Likewise, the contacts of terminals 146 and 147 (FIG. 5) in the carriage time delay 88 are closed to energize carriage tension rheostat 150, to give the carriage motor 96, which is also called torque motor, a spring-like tension, permitting said motor to be immobilized while urging the carriage 13 towards the left against the escapement dog 491 as shown in FIGS. 15 and 23 and as will be described more fully, without shutting off power to said motor. The rheostat 150 reduces power to the carriage motor 96 during the step by step operation compared to the power employed for the motor in seeking its initial line position. The closing of the terminals 146 and 147 as described, completes one print cycle and records one line on both the internal record tape 16 and the depositor's passbook 14.

Having completed one printing cycle, the print reset relay 116 will continue to operate through similar cycles in accordance with the number of units of 25¢ value transmitted to the units storing relay 50 and to subtract these units in said relay as they are translated into printing cycles on successive line spaces of the passbook 14 and record tape 16, in response to the operation of the motor shaft switch 110, so long as the cam switch 62 in said relay 50 holds the circuit of the coil 70 of the relay 71 closed, or until the last line on the passbook has been used. In the former case, when the units transmitted to the units storing relay 50 are exhausted, the cam 60 in said relay opens the circuit of the coil 70 of the relay 71 and energizes a book solenoid 155 (see also FIG. 28) to eject the passbook 14. To start a new run of printing cycles, the passbook 14 must be reinserted in proper position on the carriage 13, a new selector line key 25 must be depressed and the print switch button 30 must again be actuated.

In the second case, where the last line on the passbook 14 has been used, a carriage limit switch 156 (FIG. 4) on the left hand end of the carriage 13 is operated by the carriage in position to open the circuit of the coil 80 of the motor relay 81 and to close the circuit of the book solenoid 155 to eject the passbook 14.

To continue the printing operation, the passbook 14 must be opened up to a new page and put back in position on the carriage 13, a new selector line key 25 must be depressed, and the print switch button 30 must again be actuated. A second limit switch 160 on the left hand end of the travel of the carriage 13 normally opened and in the circuit of the line light 27 (FIGS. 1 and 4) is also closed by the carriage at the same time the limit switch 156 is operated. The energized line light 27 indicates the necessity for a new procedure to be followed by the depositor in order to continue operations.

It should be noted in connection with the limit switch 156, that this switch is normally in position to close the circuit of the motor relay coil 80 and to maintain said circuit closed after initial energization of said coil, even though the switch 107 in the carriage time delay relay 88 on which the initial energization of the motor relay coil 80 depended has opened upon energization of coil 87 of said carriage time delay relay. Therefore, when the limit switch 156 is shifted by the carriage 13 as it reaches the limit of its left hand movement from position shown in FIG. 4, to position to close the circuit of the passbook ejector solenoid 155, the circuit of the motor relay 80 is opened, thereby creating the stoppage conditions described above.

A print shaft switch 161 in the circuit of the motor relay coil 80 is operated by a cam 162 (FIG. 14) from the print shaft 111 in such a way that the switch is open at the beginning of rotation of the print shaft, and immediately thereafter is closed by said print shaft and remains closed until the end of one revolution of the print shaft, whereupon it opens. This assures the energization of motor relay coil 80 for at least long enough to complete the revolution of the print shaft 111, even though the switch 107 in the carriage time delay relay 88 has opened and even though the carriage has reached the limited position to shift the limit switch 156. A print shaft switch 163 in the circuit of relay coil 70 is operated by the cam 162 (FIG. 14) from the print shaft 111 in such a way that the switch is open at the beginning of rotation of the print shaft, and immediately thereafter, is closed by said print shaft and remains closed until the end of one revolution of the print shaft, whereupon it opens. This assures the energization of the relay coil 70 for at least long enough to complete the revolution of the print shaft 111, even though the cam switch 62 has returned into position shown in FIG. 4 out of the circuit of said relay coil.

The three switches 131, 161 and 163 are operated the same way from the print shaft 111 through cams, 132 and 162 as described, and as shown in FIG. 14, and may be combined into a single triple pole switch operated from a single cam on said print shaft.

The print motor 86 remains energized as long as the cam switch 62 (FIG. 4) in the units storing relay 50 is in the circuit of the relay coil 70 and as long as the carriage 13 has not reached the limit switch 156 at the end of its left hand travel after the last line space in the passbook has been used up. Since this cam switch 62 remains in the circuit of the relay coil 70 until all of the unit pulses stored in the relay 50 have been translated into successive line printing operations in the passbook 14 and record tape 16, it is seen that the print motor 86 operates continuously through successive line printing cycles, until all of the successive line entries corresponding to the amount of coins deposited have been made, whereupon said cam switch will return to position shown in FIG. 4 out of the circuit of the relay coil 70 and the machine will shut down until another round of coin depositing, line selecting and print button pressing operations are performed.

It should also be noted that the carriage motor 96 (FIG. 5), once it has reached the first line entry position, remains energized for the successive line entry cycles through the rheostat 150. The carriage motor 96 being a torque motor will urge the carriage 13 towards the left with spring-like tension while said motor is energized, without overheating, even though the carriage is locked against leftward travel for printing operations. The carriage 13 is released by a mechanism to be described after movements towards the left step by step for successive line printing cycles under the constant driving action of the carriage motor 96. As already described, the rheostat 150 in the circuit of the carriage 96 reduces the power necessary to move the carriage 13 step by step compared with that required for the carriage at the start of a run of line printing cycles while seeking a key selected line.

The carriage time delay relay 88 once actuated by energization of its coil 87 through its two delay periods during the first cycle of a printing run, remains unchanged, until the end of the run. The print time delay relay 120 on the other hand is restored to original condition near the end of each cycle of a run.

*Print selector dial system and sprocket drive mechanism for setting up printing mechanism therefrom*

As already generally described, a dial system 15 (FIGS. 1 and 6) is provided by which certain identifying and recording data may be set up in a printing mechanism by the depositor and a specific bank of a group participating in the use of the machine may be selected.

In the passbook 14 and the record tape 16 shown in FIGS. 2 and 3, the entry 170 and 170a in the first column therein is the machine number, the necessary adjustment in the print wheels for that purpose, being set by the bank through adjustment dials 171 (FIGS. 1 and 10) in a manner to be described and being fixed for an indefinite time thereafter, so that the passbook of every depositor who uses that machine will have that entry therein. The banks, therefore, are able to determine from the passbook 14 and record tape 16, the machine in which the deposit transaction was carried out.

The entries 172 and 172a in the second column of the passbook 14 and record tape 16 shown in FIGS. 2 and 3, are the initials of the depositor's name, and each of these entries has three subcolumns $f$, $g$, and $h$, each subcolumn designating the corresponding initial of the depositor. The depositor operates the dial system 15 to select the three initials of the depositor's name, and these are translated into coded indicia and entered as such in the passbook 14 and record tape 16, so that secrecy may be maintained and the fact of deposit may be affirmed. Moreover, in case the page of the coded passbook 14 is lost, it cannot be misappropriated by anyone else.

In the specific code system employed, the dial system 15 comprises three initial dials 173, 174 and 175 (FIGS. 1, 6 and 27), each carrying a drum 176 (FIG. 6) bearing on its circumference all of the letters of the alphabet in sequence visible selectively through a window 177 in the machine cover 10. The shafts of the dials 173, 174 and 175 have affixed thereto respective bevel gears (not shown) meshing with bevel gears 178, 179 and 180 respectively on transmission shafts 181, 182 and 183 respectively leading to the sprocket print wheel drive.

In FIG. 6, the letters on the drums 176 of the dials 173, 174 and 175 are shown equally spaced except for certain gaps, these gaps corresponding to types on the print wheels other than those designating initials, such as asterisks, dashes and the like. However, these auxiliary print types may be dispensed with, in which case, the letters are equally spaced in sequence throughout the entire circumferences of the drums 176, except that the drum on the dial 173 or 174 should have a dash or blank indicia used in cases where the depositor has no middle name.

The print wheels to be described set by the dials 173, 174 and 175, have print types thereon designating numbers, so that the selected initial letters are coded and entered as corresponding numbers in the passbook 14 and record tape 16. Since there are 26 letters in the alphabet, the print wheels would have to print or type numbers from 1 to 26. This requires for each initial dial 173, 174 and 175, a set of two adjoining print wheels, one being the digit wheel carrying print types 0, 1, 2, 3, 4, 5, 6, 7, 8 and 9 on its circumference, and the other being the tens wheel and carrying similar print types.

The shaft 181 operated from the first initial dial 173 carries a sprocket 184 (FIGS. 6 and 8), which by means of a chain 185 passing over an idler 186 drives a sprocket 187 (FIGS. 7 and 9) connected directly through a tube 188 to the drive pinion for both the upper and lower digit print wheels within the printing mechanism, as will be more fully described hereinafter. The particular set of print wheels operated by this tube 188 is the digit wheels, which type the digit number in subcolumns $f$ (FIGS. 2 and 3) of entries 172 and 172a in the passbook 14 and the record tape 16. The coding is such that the initial letter A on the dial 173 (FIG. 6) corresponds to the number 1 on the print wheels, the letter B corresponds to the number 2 and so on up to letter I corresponding to number 9. Up to and including the letter I, the tens wheels of the set of print wheels remain in position to type the zero (0) number. A further turn of the dial 173 beyond the letter I causes a further turn in the sprocket 187 (FIGS. 7 and 10) and moves the tens wheel from zero (0) typing position one step into position to type the numeral 1. The mechanism for shifting the tens print wheel one step every time the digit print wheel moves through the steps necessary to type the numbers from 1 to 9 and 0 is shown in FIG. 9, and is as follows:

A pin 190 on the sprocket 187 near the end of each revolution of said spocket bears against a cam surface 191 on a pawl 192 slidable against a spring 193 on a fixed guide 194 and slidably supported on a shaft 195 bearing a gear 196. This gear 196 is locked against rotation by a pin 197 extending in one of the interdental spaces of said gear. When the sprocket 187 has made one revolution corresponding to the full range of digit numbers 1–9 and 0, the pin 190 slides the pawl 192 to move the pin 197 out of locking engagement with the gear 196. This gear 196 meshes with a gear 200 (FIGS. 7, 9 and 10) mounted on a dead shaft 201 which also supports the sprocket 187 coaxial therewith, and as the pin 197 moves out of locking engagement with the gear 196 and releases the latter gear, the pin 190 on the sprocket 187 engages a tooth of the gear 196 and rotates said gear 196 as well as its mating gear 200 through an angle equivalent to the spacing between successive types in the tens print wheel. The gear 196 is wider than the gear 200 to permit the pin 190 to engage the gear 196 without interfering with the gear 200. The gear 200 is connected by a tube 202 to the drive pinion for both the upper end lower tens print wheels, so that the movement of the gear 200 as described, moves the tens print wheels from 0 to 1. Thus, when the initial dial 173 (FIG. 6) is turned to the position corresponding to the letter J, the digit print wheels will be turned to position to type the numeral 9, while the tens print wheels will be in position to print the numeral 0 and when the first initial dial 173 is moved one step beyond position J to position I, the digit print wheels will move into position to print the numeral 0, and the tens print wheels will move into position to print the numeral 1. Thus, the next letter J in the first initial dial 173 sets up number 10 to be printed by the combined digit and tens print wheels in subcolumn f (FIGS. 2 and 3) of each entry 172 and 172a.

The next initial dial 174 (FIG. 6) for selecting the type for subcolumn g of each entry 172 and 172a has a sprocket 203 on the shaft 182 driven by said dial. A chain 204 passing over this sprocket 203 and over an idler 205 supported on the shaft 181 drives a sprocket 206, which is supported on the dead shaft 201 and which is connected to one end of a tube 207, the other end carrying the pinion which drives the upper and lower digit print wheels. A gear 210 alongside of the sprocket 206 on the dead shaft 201 is driven by a mechanism similar to that for driving the gear 200 in FIG. 9, and is connected to a tube 211 for the drive pinion for turning the upper and lower tens print wheels one step for every revolution of the digit print wheels, as described in connection with the operation of the first initial dial 173.

The third initial dial 175 (FIG. 6) for selecting the type for subcolumn g of each entry 172 and 172a (FIGS. 2 and 3) has a sprocket 213 (FIG. 6) on the shaft 183 driven by said dial. A chain 214 passing over this sprocket 213 and over an idler 215 supported on the shaft 181 drives a sprocket 216 (FIGS. 7 and 10), which is supported on the dead shaft 201 and which is connected to one end of a tube 217, the other end carrying the pinion which drives the upper and lower digit print wheels. A gear 218 alongside of the sprocket 216 on the dead shaft 201 is driven by a mechanism similar to that for driving the gear 200 in FIG. 9, and is connected to a tube 220 for the pinion which turns the upper and lower tens print wheels one step for every revolution of the digit print wheels, as described in connection with the operation of the first initial dial 173.

As a result of the proper selection on the dials 173, 174 and 175, the print wheels are set to print in code numbers the initials of the depositor in the second column as entries 172 and 172a (FIGS. 2 and 3). In the specific form shown, the coded entry is 16.06.22. This corresponds to the initials P. F. V.

The entries 222 and 222a (FIGS. 2 and 3) in the third column of the passbook 14 and record tape 16 are the clearing house numbers or other bank code numbers corresponding to the bank selected by the depositor. The selection for this entry is made from a dial 224 (FIG. 6) in the dial system 15. The dial 224 has a drum 225 with the names of the different banks thereon visible through a window 226 (FIG. 1) in the cover 10 of the machine and the selection made on this dial not only sets the print wheels for the typing of code numbers corresponding to those of the selected bank but through the dial switch 141 (FIGS. 5 and 6) selects the counter 18 to be operated.

For effecting the bank selection described, the dial 224 has a bevel gear (not shown) meshing with a bevel gear 227 on a shaft 228 carrying two sprockets 229 and 230 driven together. On the sprocket 229 is a chain 231 passing over an idler 232 on a shaft 233 and over a sprocket 234 (FIG. 8) on a dead shaft 235, to drive part of the print wheel set through a tube transmission to be described, for typing the entries 222 and 222a in the passbook 14 and record tape 16 (FIGS. 2 and 3). On the sprocket 230 is a chain 236 (FIGS. 6 and 8) passing over a sprocket 237 on the shaft of the dial switch 141 to close the proper circuit to the bank counter 18 corresponding to the selected bank name, and passing over an idler 239 on the shaft 233 and over a sprocket 238 (FIG. 10) on the shaft 235 to drive the other part of the print wheel set for typing the entries 222 and 222a in the passbook 14 and the record tape 16.

Where the number of banks sharing the machine is reduced, the proper change in the machine can be made very easily by reducing the number of connections to the dial switch 141, cutting out corresponding connections to the counters 18 and replacing the dial 224 with its corresponding drum 225 to indicate the proper banks sharing the machine.

In the fourth column of the passbook 14 (FIGS. 2 and 3) and record tape 16 is typed entries 240 and 240a corresponding to the transaction or deposit number, these indicating the number of twenty-five cent deposits made in the machine to the credit of the depositors. The numbers in these entries 240 and 240a are consecutive and are typed automatically by means of the usual automatically operable consecutive numbering mechanism.

The last entry 241 in the record tape 16 is the month and day of depositor's birthday for purposes of identification and/or verification by the bank, but the passbook 14 has no corresponding entry. The selection for this entry is made by the depositor on dials 242 and 243 (FIG. 6) of the dial system 15. The dial 242 has a drum 244 bearing designations indicating the months of the year visible successively through a window in the cover 10 upon rotation of said dial and the dial 243 has a drum 246 bearing designations indicating the days of the month, visible successively through a window in said cover upon rotation of the latter dial. The dial 242 carries a bevel gear (not shown) meshing with a bevel gear 250 on a shaft 251, which also carries a sprocket 252. A chain 253 passes over this sprocket 252 and over an idler 254 and drives a sprocket 255 (FIGS. 6, 8 and 10) secured to a shaft 256 to which is affixed the pinion driving the upper print wheels carrying the month print type, as will be described more fully hereinafter.

The dial 243 (FIG. 6) carries a bevel gear (not shown) meshing with a bevel gear 257 on the shaft 233 which also carries a sprocket 259. A chain 260 passes over an idler 261 on the shaft 251 and drives a sprocket 262 loose on the shaft 256 (FIG. 10). A sleeve from this sprocket 262 drives a pinion which in turn drives the digit print wheel in a manner to be described. A gear 263 (FIGS. 6 and 10) corresponding to the gear 200 in the construction of FIG. 9, drives the tens print wheel one step for every revolution of the digit wheel, in the manner described in connection with the construction of FIG. 9.

*Mechanism for operating printing mechanism*

As previously described, the selections made on the dial system 15 sets the print wheels in position in accordance with these selections, to print both on the passbook 14 and on the record tape 16. The record tape 16 is carried on a storage roll 300 (FIGS. 11 and 12). From this roll, the record tape 16 passes over a roller 301 carried by a lever 302 pivoted on a stud in the frame of the machine. From roller 302, the tape 16 extends to the right and passes over a shaft 303 and then over three rollers 304 carried by plates (not shown) fast to each end of an upper impression block 306 for supporting the upper platens, as will be described later. After passing around the upper one of rollers 304, the record tape 16 passes to the left and around a roller 307 carried by an arm 308 pivoted on the machine frame. The record tape 16 then passes onto a receiving roll 310 loose on a rod 311 also mounted on the machine frame.

The record tape 16 is fed step by step from the print shaft 111, each step presenting a new line space to the printing mechanism by turning the receiving roll 310 step by step. The mechanism for performing this step by step feed of the record tape 16 and for automatically compensating for the accumulation on the receiving roll 310, per se, is not new and may be similar to that disclosed in the U.S. Patent 1,761,542 especially FIGS. 31 and 42.

Both the upper and lower print wheels type through a continuous ink ribbon 312 which receives its supply of ink from an ink roller 313. The ribbon 312 passes about two metal shields 314 and 315 and is held taut by an idler 316. The operation of the ribbon mechanism, including its step by step feed, per se, is old and may be of the type disclosed in U.S. Patent 1,761,542 especially in FIGS. 27, 30 and 31. Between the two shields 314 and 315 is the upper set 317 of print wheels for printing on the record tape 16 and the lower set 318 of print wheels for printing on the passbook 14.

If desired, the ribbon mechanism and its feed may be of the type employed conventionally in typewriters.

For operating the record tape impression mechanism, there is loosely mounted on the rod 303 a frame comprised of two side arms 320. Integral with the left hand ends of these side arms 320 is a crossbar 321 and at the right hand ends thereof is the previously mentioned impression block 306 which supports a plurality of platens 322. In order to take an impression from the upper set 317 of type wheels, it is necessary to rock the frame carrying the platens 322 clockwise and thereby to bring the platens into position to press the record tape 16 against the ink ribbon 312 and the ink ribbon against the upper set 317 of print wheels, so that necessary entries in the record tape are made. This is done in the following manner:

Fast to one of the arms 320 is an arm 325 pivoted to a link 326, which at its low end is pivoted to a lever 327 loose on a rod 328. At its left hand end, this lever 327 carries rollers 330 and 331 co-operating with two cams 332 and 333 respectively pinned to a shaft 334. Also fast on this shaft is a Geneva wheel 335. A disk 336 fast on the print shaft 111 carries a pin 337 adapted to co-operate with the Geneva wheel. The print shaft 111 and disk 336 are rotated in a counter clockwise direction on every cycle of the machine. The pin 337 will engage one of the notches of the Geneva wheel 335 and give said wheel a partial rotation, which through shaft 334 will rotate the pair of cams 332 and 333. These cams are so shaped as to rock the lever 327 first clockwise and then counter clockwise to normal. This movement, through link 326 and arm 325 will lower the platen frame to take an impression from the type of the upper set 317 of print wheels and will then return it to its normal position.

There are a plurality of platens 340 for making impressions on the different columns of the passbook 14. All of these platens are carried by U-bars 341 (FIGS. 11 and 12) supported by arms 342 which are pivoted on rod 328 previously described. These platens 340 are actuated by mechanism to be presently described, to strike the passbook 14 a sharp blow in order to transmit impressions to said passbook from the lower set 318 of print wheels.

Running across the printing mechanism beneath all of the arms 342 is a yoke 343 which is pivotly mounted on the rod 328 by means of arms 344 supporting a rod 345 to which are attached springs 346 that hold the arms 342 in contact with the yoke 343. A link 347 pivoted to a bell crank lever 348 loose on the shaft 334, has a notch 350 engaging the rod 345. This lever 348 has a sharp nose 351 cooperating with a cam 352 fast on the print shaft 111.

The print shaft 111 is given one revolution rotation in a counterclockwise direction upon each operation upon each cycle of a run. It can be seen that as the nose 351 of the bell crank 348 rides upon the high portion of the cam 352, said bell crank will be turned clockwise, thereby turning the yoke 343 clockwise through the engagement of the link 347 with the rod 345. This rocking movement of the yoke 343 clockwise is against the tension of a spring 353, one end of which is attached to one of the yoke arms 344, and the other end to the machine frame. The rocking movement of the yoke 343 away from the platen carrying arms 342 permits them to rotate clockwise by means of gravity assisted by the springs 346. When the nose 351 on bell crank 348 passes the high part of cam 352, the spring 353 will rotate the yoke 343 quickly due to the abrupt ending of the high section of the cam and will cause thereby the platens 340 to rotate counterclockwise rapidly, until a toe 355 of one of the yoke arms 344 comes in contact with a stop 356 on the base of the machine, whereupon the yoke will be stopped. The platens 340, however, will continue their rapid counterclockwise movement and so strike the passbook 14 on the carriage 13 to take impression from the lower set 318 of the type print wheels.

*Print wheel mechanism*

FIG. 10 shows a section through the upper set 317 of print wheels and through the drive mechanism for setting said wheels rotatively in the proper typing position in accordance with the data entered into the machine by the dial system 15. The upper set 317 of print wheels are supported on a dead shaft 370 and include a group of print wheels 371 for printing the entry 170a (FIG. 3) in the first column of the record tape 16 corresponding to the number of the machine. Four print wheels 371 are shown in this group. The first wheel being wider than the others for the double letter item, and the other three merely carrying the numbers in the three subcolumns of the entry 170a.

As previously described, the upper group of print wheels 371 are adjusted through the adjustment dials 171 by the banks and these print wheels are left undisturbed in adjusted position indefinitely. Four adjustment dials 171 are provided, one for each print wheel 371, these adjustment dials having respective hubs 372 mounted loosely in nested relationship on the dead shaft 201 (FIGS. 7 and 10) for rotation thereabout, each of said hubs having connected thereto respective pinions 374 meshing with respective print wheels to rotate said wheels upon rotation of the adjustment dials 171. Each of the hubs 372 except the outside one has an inner part 376 fixed against axial movement, and an outer part 377 rigidly connected to the corresponding adjustment dial 171 and having a tongue and recess connection with the inner part, permitting said hub inner parts to be pulled out axially while maintaining drive connection between the inner and outer hub parts, causing said hub parts to rotate about the dead shaft 201 in unison. The adjustment dials 171 are knurled and serve as knobs accessible from the outside of the machine, and the tongue and recess connections between the different parts of the hubs permit these adjustment dials to be pulled forwardly relative to the inner parts of the hubs fixed against axial movements.

With the construction described, the adjustment dials 171, except the outside one, can be separately pulled from closely nested position where they cannot be conveniently handled for turning for adjustment purposes. The tongue and recess connections between inner and outer hub parts 376 and 377 are not broken by this forward movement of the adjustment dials 171, so that the turnings of the extended adjustment dials cause the rotations of the print wheels 371 through the pinions 374 to the desired printing positions. With the three inside adjustment dials 171 pulled out, the outside adjustment dial 171 can be easily manipulated without the need of extending the latter wheel.

A key lock may be provided for locking the adjustment dials in closely nested position against unauthorized tampering by locking the pinions 374 driven from said dials.

The lower set 318 (FIG. 11) of print wheels includes a group of print wheels, which are similar to the group of print wheels 371 (FIG. 10) in the upper set 317 and which are disposed directly below the print wheels respectively of the upper group, to print the same machine number entry 170 (FIG. 2) in the first column of the passbook 14 as is printed in the first column of the record tape 16. The pinions 374 (FIG. 10) on one side side of the print wheels mesh not only with the upper group of print wheels 371 to turn the latter print wheels but also mesh with the corresponding lower group of print wheels to turn to the same extent the latter wheels. A set of idlers 380 on the other side of the print wheels meshing with the upper group of print wheels 371 and the corresponding lower group of print wheels, assure maintenance of proper rotative relationship between the upper and lower groups of print wheels.

For coding the depositor's initials into corresponding numbers and for printing these numbers as entry 172a (FIG. 3) in the second column of the record tape 16, the upper set 317 (FIG. 10) of print wheels supported on the dead shaft 370 include a second group of print wheels 400 adjustable about said shaft. There are six of these print wheels 400 arranged in sets of two, each set including a digit print wheel and a tens print wheel, the first set typing subcolumn f of entry 172a (FIG. 2), the second set typing subcolumn g, and the third set typing subcolumn h.

For setting the upper group of print wheels 400 (FIG. 10), the dead shaft 201 supports for rotation thereabout six drive pinions 401 meshing with the print wheels 400 respectively and connected to the gears and sprockets 200, 187, 206, 210, 218 and 216 (FIGS. 7 and 10) by drive tubes 202, 188, 211, 207, 220 and 217 nested together on the dead shaft 201. The sprockets 187, 206 and 216 driving the corresponding digit print wheels 400 through the tube and drive pinion connections described, are connected to the initial dials 173, 174 and 175 (FIG. 6) through the sprocket and chain drives previously described. The gears 200, 210 and 218 (FIG. 10) are operated through one step for every revolution of the corresponding sprocket 187, 206 and 216 as described in connection with FIG. 9, and drive the corresponding tens print wheel 400 through the tube and drive pinion connections described.

The lower set 318 (FIG. 11) of print wheels includes a group of print wheels which are similar to the group of print wheels 400 in the upper set 317 and which are disposed directly below the print wheels respectively of the upper group, to print the same coded initial entry 172 (FIG. 2) in the second column of the passbook 14 as is printed in the second column of the record tape 16. The pinions 401 (FIG. 10) mesh not only with the upper group of print wheels 400 to turn the latter print wheels but also mesh with the corresponding lower group of print wheels to turn to the same extent the latter wheels.

For printing the entry 222a (FIG. 3) on the record tape 16 corresponding to the code number of the bank selected through operation of the dial 224 (FIG. 6), the upper set 317 (FIG. 10) of print wheels supported on the dead shaft 370 include a third group of print wheels 410 on said shaft. There are five of these print wheels 410 shown, the first set of two wheels being joined together for operation in unison and bearing two circumferential adjoining rows of numbers, the last set of two wheels being joined together for operation in unison and bearing two circumferential adjoining rows of numbers, and the middle print wheel being merely a spacer with a series of punctuation print types thereon, such as dash types and being either fixed or attached to either set of print wheels.

For driving the two sets of print wheels 410 described, there are provided two drive pinions 411 on the dead shaft 235 meshing with respective pinions 413 free to rotate on the supporting shaft 256 and each meshing with a print wheel 410 of the corresponding set of print wheels 410. The pinions 411 are connected to respective nested tubes 412 on the shaft 235. These tubes 412 carry the respective sprockets 234 and 238 driven from the bank selector dial 224 (FIG. 6), as previously described.

The lower set 318 (FIG. 11) of print wheels include a group of print wheels which are similar to the group of print wheels 410 (FIG. 10) in the upper set 317 and which are disposed directly below the print wheels respectively of the upper group, to print the same bank code number entry 222a (FIG. 3) in the third column of the passbook 14, as was printed in the third column of the record tape 16. This lower group of print wheels may be driven directly from the pinions 413 meshing not only with the print wheels of the lower group but with the print wheels of the upper group and/or from a series of idlers 414 (FIG. 10), which are loose on the outside tube 217 and which mesh with both upper and lower groups of print wheels.

The upper set 317 (FIG. 10) of print wheels supported on the dead shaft 370 include a group of print wheels 415 for printing the entry 240a (FIG. 3) in the fourth column of the record tape 16 corresponding to the deposit or transaction. Six print wheels 415 are shown in this group, these constituting the digit print wheel, the tens print wheel, the hundreds print wheel, the thousands print wheel, the ten thousands print wheel and the hundred thousands print wheel and these are automatically operated by a consecutive number mechanism well known in the art, such as that described in U.S. Patent 1,394,256 especially in FIGS. 24, 37 and 57. In that mechanism, differentially tined pawls (not shown) operate the digit print wheel 415 (FIG. 10) by means of idler pinions 416 on the shaft 256 through successive steps from 1–9 type positions and upon the tenth step to 0 type position, whereupon the next tined pawl operates the tens wheel through one step from 0 type position to 1 type position. The digit print wheel proceeds through successive steps for another revolution, whereupon the tens print wheel is tripped for the second step, etc. The consecutive number mechanism is operated from the print shaft 111 (FIG. 11), each revolution of the print shaft causing an actuation of the appropriate differentially tined pawl or pawls of said mechanism to turn the proper print wheel 415 (FIG. 10) and causing the printing of a transaction number in the fourth column of the record tape 16 (FIG. 3). It is possible from the readings of the entry 240a of the record tape 16 at different periods to determine from the difference between these readings the amount of money deposited in the machine during the time between these periods and to correlate the entry in the passbook 14 with that on the record tape 16 for recording or checking purposes.

The lower set 318 (FIG. 11) of print wheels includes a group of print wheels which are similar to the group of print wheels 415 in the upper set 317 and which are disposed directly below the print wheels respectively of the lower group, to print the same transaction number entry 240a (FIG. 3) in the fourth column of the passbook 14 as is printed in the fourth column of the record tape 16. The pinions 416 (FIG. 10) mesh not only with the upper group of print wheels 415 to turn the latter print wheels but also mesh with the corresponding lower group of print wheels to turn to the same extent the latter wheels.

The last entry 241 (FIG. 3) in the record tape 16 is the month and day of birth of the depositor and for that purpose, the upper set 317 (FIG. 10) of print wheels supported on the dead shaft 370 include a group of print wheels 420. Three print wheels 420 are shown in this group, the first wheel being wider than the others for the month type, the other two being the digit print wheel and the tens print wheel. The month type print wheel 420 is set from the dial 242 (FIG. 6) through a sprocket and chain drive which includes the sprocket 255 (FIG. 10) affixed to the shaft 256 as previously described. Connected to this shaft 256 is a pinion 421 meshing with the month type print wheel 420. The two day of the month type print wheels 420 are set from the dial 243 (FIG. 6) through a sprocket and chain drive which includes the sprocket 262 (FIG. 10) supported on the shaft 256 for rotation thereabout and connected to a tube 422 carrying a pinion 423 meshing with the digit print wheel 420. The tens print wheel is operated from a gear 263 connected to a tube 424 on the shaft 256 embraced by the tube 422, and rotatable about said shaft. This tube 424 carries a pinion 425 meshing with the tens print wheel 420.

The gear 263 is operated from the sprocket 262 as is the gear 200 in the construction of FIG. 9, to operate the tens print wheel 420 one step at every revolution of the digit print wheel 420.

A series of aligning and locking gears 426 supported on the outside tube 217 mesh with the print wheels 420 respectively, and are locked in the manner to be described hereinafter.

Since the birthday is not printed in the passbook 14, the lower set 318 (FIG. 11) of print wheels does not include any print wheels corresponding to print wheels 420 in the upper set 317.

Aligning mechanism may be provided to align the group of print wheels 371 (FIG. 10) in the upper set 317 of print wheels and the corresponding group of print wheels in the lower set 318 (FIG. 11) to prevent misalignment due to lost motion through the gears. For that purpose, there are provided spring-pressed pawls 435 (FIGS. 10 and 21) mounted on a stud 436 which is carried in a block 437 and bearing against the drive gears 380. A key lock may be provided to lock the pawls 435, so that unauthorized tampering with the adjustment dials 171 which set the upper print wheels 371 and the corresponding lower print wheels may be prevented.

Since the other groups of print wheels in the upper and lower sets of print wheels are set by the depositors for each deposit transaction, it may be necessary to provide more positive means for properly aligning these other groups of print wheels and for locking them during printing of the passbook 14 and record tape 16. To that end, there is provided the aligning solenoid 129 previously described in connection with the wiring diagram of FIG. 5. Aligning pawls 440 (FIG. 20) are supported on a suitably journalled rod 441 with a fixed axis for free rotation thereabout, and are spring-pressed against the gears 401, 414 and 426 (FIG. 10) respectively by springs 442 (FIG. 20) between said pawls and a fixed block 443. The aligning solenoid 129 has its plunger 444 pivotally connected to a link 445 which in turn is pivotally connected to an arm 446 secured to the rod 441 to rotate said rod in response to actuation of the solenoid. A pawl locking plate 447 rigid with the arm 446 by direct connection thereto or by fixed connection to the rod 441 bears against the series of aligning pawls 440 when the aligning solenoid 129 is energized, to lock said pawls in gear aligning positions against movement away from the gears 401, 414 and 426 (FIG. 10). The plate 447 (FIG. 20) is suitably apertured to permit the springs 442 to bear against said pawls.

FIG. 20 shows the aligning solenoid 129 energized and the pawl locking plate 447 in extreme clockwise position bearing against the pawls 440 to lock said pawls in gear aligning position and to prevent the upper and lower sets 317 and 318 (FIG. 11) of print wheels from turning during the printing operation. The aligning solenoid 129 (FIG. 20) is energized as previously described once during every revolution of the print shaft 111 by the closing of the motor sprocket switch 110 (FIGS. 5 and 14), and is deenergized before the end of the revolution of the print shaft 111 (FIG. 11) causing the pawl locking plate 447 (FIG. 20) to rotate counterclockwise and releasing the pawls 440, so that they bear against the gears 401, 414 and 426 only with spring pressure. This permits the gears 401, 414 and 426 to be rotated in response to selection on the dial system 15 to set the upper and lower sets 317 and 318 of print wheels in proper rotative position.

Print shaft drive

As previously described, the print shaft 111 (FIG. 11) drives the printing mechanism, and requires one exact and complete revolution for each printing cycle. This printing shaft 111 is driven from the print motor 86 (FIG. 13) through a speed reduction gear unit 450 having an output shaft 451 to which is connected a sprocket 452 driving a chain 453 passing over a sprocket 454 to drive the latter sprocket. The sprocket 454 is attached directly to a print shaft clutch mechanism having a pawl 455 pivotally supported at 456 on a plate 457 connected to the sprocket 454 for rotation therewith. A ratchet 458 rigidly connected to the print shaft 111 has a radial shoulder 459 adapted to be engaged by the heel 460 of the pawl 455 when the print solenoid 140 described in connection with the wiring diagram of FIG. 5, is energized. This print solenoid 140 has a plunger 461 connected to an arm 462 pivoted at 463 to a fixed frame member 464 and urged downwardly by a spring 465. An adjustable screw 466 on the arm 462 bears against and depresses the pawl 455 by the action of the spring 465, when the solenoid 140 is deenergized and holds the heel 460 of said pawl away from the shoulder 459 of the ratchet 458, thereby maintaining the print shaft 111 immobilized.

After the print motor 86 starts to rotate and after the contacts of the terminals 134 and 136 (FIG. 5) of the print time delay relay 120 have closed after the initial delay period in said relay, as previously described, the print solenoid 140 is momentarily energized, causing the arm 462 (FIG. 13) to be lifted and the screw 466 to be raised from engagement with the pawl 455. This permits the pawl 455 under the action of a spring 470 to move into engagement with the ratchet 458 to rotate thereby the print shaft 111. At the end of a complete revolution of the print shaft 111, the print solenoid 140 having in the meantime been deenergized, the pawl 455 is again depressed by the screw 466 under the influence of the spring 465, causing thereby the sprocket 454 to be disengaged from the print shaft 111. An arm 471 pivotally carried by the plate 457 and urged by the spring 470 against a collar 472 affixed to the print shaft 111 prevents the shaft from overrunning beyond its one revolution. The print shaft 111 may be stopped precisely at the end of its revolution by a roller (not shown) at the end of a pivoted spring-loaded arm (not shown), acting on a cam (not shown) which is on the print shaft and which has a deep indent for said roller at the stopping position.

Carriage drive and lock

As previously described, the passbook carriage 13 is moved across the print wheels by means of the reversible motor 96 (FIG. 5). This motor 96 drives a shaft 480 (FIG. 26), which in turn drives another shaft 481 through a chain and sprocket drive 482. This shaft 481 carries a gear 483 (FIGS. 15 and 23), which meshes with a drive rack 484 on the carriage 13. Rotation of this gear 483 in either direction drives the carriage 13 in corresponding directions for the purposes already described and to be described more fully.

As previously described in connection with the wiring diagram of FIG. 5, initial energization of the carriage motor 96 moves the carriage to the right from its last operating position and starts its search for the new line key locking position as indicated by the depressed line key 25 (FIGS. 1 and 15). Should the lock position be to the left of the carriage's starting position, the carriage 13 will move all the way to the right until it strikes the limit switch 100 (FIGS. 5 and 24). This energizes the carriage relay coil 101, thereby closing the switch 105 and reversing the carriage motor 96 and at the same time energizing the carriage solenoid 102. The energized carriage solenoid 102 releases a locking mechanism to be described, which normally permits the carriage 13 to move toward the right at all times, whether the solenoid is energized or not, but which locks the carriage against movement towards the left while the carriage solenoid 102 is deenergized. Upon energization of the carriage solenoid 102, the locking mechanism is released and the carriage 13 is permitted to move towards the left to seek the selected line position until the carriage reaches this position.

After the first cycle of a run, in which a selected line of the passbook 14 has been printed, the carriage solenoid 102, due to the condition of the carriage time delay relay 88, remains deenergized, but the escapement mechanism, nevertheless, causes the carriage 13 to move step by step automatically to the left to print on successive lines of the passbook 14 and the record tape 16, until the run is completed. This escapement mechanism by which the carriage 13 is moved towards the left step by step automatically, will be described hereinafter. The mechanism by which the carriage 13 is locked against movement towards the left during the first cycle and released for movement towards the left after it has shifted the limit switch 100 on the right side of travel of the carriage is as follows:

The passbook carriage 13 is locked during print operations against movement to the left by an escapement rack 490 (FIGS. 15, 19 and 23) connected to the carriage 13 for movements therewith and engaged by an escapement mechanism to be described and urged into locking engagement with said rack by a spring 493. A finger 494 secured to a rock shaft 495 engages a pin 496 on the dog 491 when the shaft is rotated in one direction to rotate the dog out of locking engagement with the rack 490 and thereby to permit the carriage 13 to move towards the left to seek the line selected by the depositor through manipulation of the proper selected key 25.

The rotation of the rock shaft 495 is effected from the solenoid 102 previously described in connection with the wiring diagram of FIG. 5. To that end, the plunger 496 (FIG. 19) of the carriage lock solenoid 102 is connected to a link 497, which in turn is connected to an arm 498 secured to a rock shaft 500 journalled in a fixed frame 501 and urged counterclockwise by a spring 502. A stop 503 on the arm 498 seating on the frame 501 limits counterclockwise rotation of the arm through the action of the spring 502. A crank 504 secured to the rock shaft 500 engages an arm 505 on the rock shaft 495 and urges the latter shaft clockwise through the action of the spring 502.

Upon energization of the carriage solenoid 102, the rock shaft 495 is rotated counterclockwise and this causes the finger 494 to engage the pin 496 on the escapement dog 491 and to rotate said dog clockwise out of locking engagement with the escapement rack 490. This permits the carriage 13 to move towards the left after it has shifted the limit switch 100 momentarily into closed position.

After the carriage 13 reaches its selected line position, the contacts between terminals 90 and 91 (FIG. 5) in the carriage time delay relay 88 open and the contacts between terminals 90 and 106 in said relay close as previously described, causing the carriage solenoid 102 to become deenergized, this returning the escapement dog 491 into locking engagement with the escapement rack 490. Thereafter, for the other succeeding cycles of the run, the carriage solenoid 102 remains deenergized and the periodic release of said dog for these succeeding cycles, to permit automatic step by step feed of the carriage towards the left is accomplished by the following mechanism:

*Automatic step by step carriage feed mechanism*

The carriage 13 (FIGS. 15–18) consists essentially of a frame structure 520 with a bank of line selector keys 25 and a passbook guide 521, hold down clip 522 and passbook supporting plate 523 carried on front flange wheels 524 running on fixed rails 528 between said flange wheels and rollers 530. Likewise, small rollers (not shown) are mounted on the back of the carriage 13 and operate in a channel to guide the carriage movement. Mounted on the carriage 13 is the escapement rack 490 and the gear drive rack 484 with which the drive gear 483 driven from the carriage motor 96 meshes.

Each of the line selector keys 25 corresponds to a line on the passbook 14 and has a corresponding number designation on the head thereof. Each key 25 is normally held in uppermost inactive position by a spring 532 and operates through a lock plate 533 common to all of the keys. The lock plate 533 is spring-loaded towards the right and has slots 534 sufficiently wide to allow tapered key locks 535 on the shanks of the keys 25 to pass through freely, either when the key is depressed against the action of its spring 532 or when the lock plate 533 is moved to the left against its loading spring. Also mounted on the key assembly by pins 536 is a release bar 537 having diagonal slots 538 and engaging the lock plate 533 at the regions 539 to move the lock plate towards the left upon upper movement of the release bar, thus releasing any depressed key 25 and causing it to return to uppermost position under the influence of its spring 532. In a like manner, the tapered key lock 535 of any key 25 in raised position, when depressed will move the lock plate 533 towards the left by the cam action of said key thereon, and will thereby release any previously depressed key into raised position.

At the beginning of a run, a key 25 is depressed to select the initial line of the passbook 14 on which the first entry is to be made. That particular depressed key 25 determines the initial position of the carriage 13 at the beginning of the run. The carriage 13 is initially located by a pair of stop gate plates 542 pivotly mounted on a frame member 543 at 544 and spring-loaded by a common spring 545, tending to rotate them in opposite directions, the left hand plate being urged counterclockwise by said spring and the right hand one clockwise. A common stop 546 limits their position.

It can be seen with the arrangement described that should the carriage 13 be in such a position that the depressed key is to the left of the stop gate plates 542, the carriage will move to the right in the manner described. The lower end of the depressed key 25 first coming into contact with the left hand stop gate plate 542 will rock said plate clockwise against the action of the spring 545, until it has passed the plate, when said plate will return to its normal position. The depressed key 25 will then strike the edge of the right hand stop gate plate 542, and as this plate cannot be rocked in this direction, the carriage will be stopped, and the selected line in the passbook 14 will be in position to receive a print impression. If the depressed key 25 is on the right hand side of the stop gate plate 542, the carriage 13 will move to the right until the carriage reaches the limit switch 100 (FIGS. 5 and 24) and reverses to the left as previously described until the depressed key reaches the right hand stop gate plate 542 (FIG. 15). As the depressed key 25 moves towards the left along the right hand stop gate plate 542, it will rock said plate counterclockwise and then engage the edge of the left hand plate 542 thereby stopping the carriage with the depressed key between the plates 542 as shown in FIG. 15.

During movement of the carriage 13 to the right during its initial selected line-seeking operation, the holding dog 491 pivoted at 492 on an escapement plate 550 is free to snap in and out of the teeth of the escapement rack 490. As previously described, at the end of the rightward travel of the carriage 13 in the operation of seeking its initial selected line printing position, the carriage motor 96 reverses and the carriage solenoid 102 (FIG. 19) is energized. This causes the finger 494 (FIGS. 15 and 23) to rock into position to depress the pin 496 on the holding dog 491 and to hold said dog from engagement with the escapement rack 490, while the carriage moves from right to left in a continuing search for the selected line position.

When the carriage 13 reaches selected line position with the depressed key 25 between the stop gate plates 542, the solenoid 102 is deenergized, the carriage 13 is locked by said key and the machine is ready for printing, whereupon the print shaft 111 starts to revolve in a counterclockwise direction (FIG. 15). The print shaft 111 carries a cam 551 (FIGS. 15–18) which in its counterclockwise rotation first engages a cam 552 on a U-shaped rocker 553 pivoted on a fixed frame 554 at 555. This rocker 553 is pivotly jointed by a pin 557 to an idler link 558 loaded by a spring 560 and carrying this pin. The engagement of the cam 551 in its counterclockwise rotation with the cam 552, swings the idler link 558 counterclockwise about the axis of the pin 557 against the action of the spring 560 and this link engaging an arm 562 pivoted at 563 and provided with a cam surface rotates said arm clockwise. This arm 562 is pivotly connected to one end of a rod 565 extending along the carriage 13 and urged towards the right by a spring 566. The clockwise rotation of the arm 562 as described, moves the rod 565 towards the left against the action of the spring 566. The other end of the rod 565 has a pivotal connection 568 with the rocker escapement plate 550 pivoted on a fixed frame at 492 for rocking movement and pivotly carrying at 492 the holding dog 491. This rocker escapement plate 550 pivotly carries at 571 a second dog 572 limited in its rocker movement relative to said escapement plate by a stop 573 secured to said escapement plate and extending through a slot 574 with clearance in said second dog. As the rocker escapement plate 550 is oscillated about its pivot support at 492 through lengthwise reciprocation of the rod 565, the dog 572 is first moved into engagement with a tooth of the escapement rack 490 while the other dog 491 is moved out of engagement with said escapement rack and vise versus. During these operations, the finger 494 is inactive in the position shown in FIG. 23 due to the continuous deenergized state of the carriage solenoid 102 and remains deenergized until the end of the run of deposits has deposited and until another deposit run has been initiated by another depositor.

The pivotal connection 568 between the rod 565 and the rocker escapement plate 550 comprises a pin 600 on the rocker escapement plate 550 and an open bearing 601 at the end of said rod for said pin. This rod 565 is held in engagement with the pin 600 by means of a spring-pressed crank 602 having a pin and slot connection with the rod. Suitable stops 604 and 605 on the fixed frame structure and on the rocker escapement plate 550 respectively are provided for adjusting the extent of rocking movement of the escapement assembly. The escapement rack 490 has two teeth missing at 606 to allow two lines to be skipped on the passbook 14 at the fold position.

When the rocker escapement plate 550 is rocked clockwise to bring the dog 572 into engagement with the escapement rack 490 and the dog 491 out of engagement with said rack, the carriage motor 96 with its spring-like tension moves the carriage to the left, the dog 572 having enough play through the stop and slot connection 573, 574 with said escapement plate to permit the carriage 13 to move only one step equivalent to the distance between successive lines in the passbook 14. Thereafter, the escapement plate 550 is rocked counterclockwise to move the dog 491 into engagement with the escapement rack 490 to lock the carriage in this one step advanced position against leftward movement, while the dog 572 moves out of engagement with said escapement plate. The carriage 13 so locked is ready to receive printing action on the passbook 14 thereon. The operation is repeated for successive cycles, until the full run of units stored in the relay 50 is released.

During the first revolution of the print shaft 111, the carriage 13 is locked against the feed action of the carriage motor 96 by the depressed key 25 located between the stop gate plates 542. Near the end of the first revolution of the print shaft 111, a pin 610 on the cam 551 contacts the offset cam surface 609 of an arm 611 pivoted at 612 and carrying a pin 613, in engagement with the underside of the release bar 537, thereby raising said bar to cause the release of the depressed key 25 as previously described. This leaves the carriage 13 held in lock position by the dog 491 in engagement with the escapement rack 409 against the tension exerted by the carriage motor 96. On the next or succeeding revolutions of the print shaft 111, the escapement mechanism described is free to allow the carriage 13 to move to the left one tooth spacing for each and every revolution of the print shaft 111 in the manner described.

*Passbook switch mechanism*

As already described, the book switch 75 (FIG. 4) is normally in position to make contact with terminal 76 and is shown comprising a button 620 (FIGS. 15 and 21) at the end of a spring leaf bearing on a tappet forming part of the switch. The button 620 normally passes through a slot 622 in the passbook supporting plate 623 of the carriage 13 in the absence of a passbook on said plate, and under these conditions, the switch is in the state shown in FIG. 4, with contact 77 in the circuit of the motor relay coil 80 open. When the passbook 14 is placed in position on the carriage plate 623, it depresses the button 620 and shifts the switch 75 (FIG. 4) to open contact 76 and close contact 77. With the switch 75 in this condition, the closing of the switch print button 30 will close the circuit of the motor relay coil 80 and start the print and carriage mechanism operating, as previously described.

If the book switch 75 is not shifted to close contact 77 by failure to place the passbook 14 on the carriage 13, the book lamp 28 (FIG. 4) will light up, assuming that the units storing relay 50 has units pulses stored therein, and that the switch 62 has been shifted into the circuit of the release coil 70. This will give proper notice to the depositor of his failure to place the passbook 14 on the carriage 13.

*Tape switch mechanism*

As previously described, the tape switch 38 (FIG. 4) is normally in position to close contact to terminal 625 in the circuit of the cam switch 40 and out of contact with terminal 626 in the circuit of the tape lamp 26. This tape switch 38 is operated from the tape supply roll 300 (FIGS. 11 and 22) by means of a feeler 627 which rides on the tape supply roll. As the tape supply roll 300 becomes almost exhausted, feeler 627 moves nearer to the axis of the roll to cause the tape switch 38 to shift into position out of the circuit of the cam switch 40 and in the circuit of the tape lamp 26 (FIG. 4), causing interruption in the operation of the machine and lighting up said lamp.

*Book ejecting mechanism*

As previously described, upon completion of a run of successive cycles, or when the carriage 13 reaches the limit of its leftward movement causing shift in the switch 156 (FIGS. 4 and 24), the book solenoid 155 (FIGS. 4 and 28) is energized and the passbook 14 is ejected forwardly on the carriage 13 from printing position. FIG. 24 shows the ejector device comprising the book solenoid 155 having its plunger 630 pivotally connected to one end of a link 631, the other end being pivotally connected to pawl 632 having its intermediate section pivoted at 633 to an upstanding arm 634 pivoted at its lower end at 635 to a fixed bracket 636 and pivoted at its upper end at 637 to a book ejector arm 638. The bracket 636 carries a pin 640 extending through an elongated guide slot in the book ejector arm 638, and has a flange 641 serving as a slide support for said ejector arm. A disk 642 secured to print shaft 111 rotates counterclockwise therewith and carries a roller 643 which engages a cam pawl 644 rotatably supported on a fix axis at 645 and biased by a spring 646 for clockwise rotation against a stop 647 on the bracket 636.

When the book solenoid 155 is energized, the pawl 632 is rotated from the position shown in FIG. 28, clockwise into the path of the cam pawl 644, and as the roller 643 engages said cam pawl, it rotates said cam pawl counterclockwise, moving the pawl 632 endwise towards the left and through toggle motion moving the ejector arm towards the left. The leftward movement of the ejector arm 638 ejects the passbook 14 by an ejector device well known in the art of bank cash registers.

Although the invention has been shown in connection with an embodiment used as a coin bank deposit register, as far as certain aspects of the invention are concerned, the invention has application to other uses in connection with other types of registers not related to bank systems. For example, the invention could be applied for the payment of insurance premiums in small increments of the payment of money on time in small increments for the purchase of stocks and bonds, etc.

Although the invention has been described in conjunction with a printing mechanism for both the passbook 14 and record tape 16, as far as certain aspects of the invention are concerned, a recording or registering mechanism of different type may be employed for one or both of these record receiving elements. For example, the recording or registering mechanism can take the form of a punching mechanism employed for use in connection with data processing machines by which punctures on the record sheet or sheets can be translated into corresponding data. This is especially true in connection with the record tape 16 which can be punctured and then processed, as for example, by means of a so-called IBM machine, to segregate and tabulate the data recorded in said tape.

While the invention has been described with particular reference to a specific embodiment, it is to be understood that it is not to be limited thereto but is to be construed broadly and restricted solely by the scope of the appended claims.

What is claimed is:

1. A register for recording a series of transactions on successive line spaces of a record sheet, comprising a recording mechanism, a carriage adapted to support a record sheet in recording relation to said recording mechanism, a drive for said carriage comprising a motor and a drive connection between said motor and said carriage, said drive moving said carriage to bring a selected line space of said record sheet in position to receive a recording impression from said mechanism, means for stopping said carriage against the driving action of said motor, a series of manually operable line selector keys for controlling the stopping position of said carriage, whereby the initial position of said carriage for the recording of the first line is predetermined, means for operating said recording mechanism through successive cycles, and escapement means for releasing said stopping means at recurrent periods in time relation to said recording mechanism operating means to cause said carriage to move step by step by the drive action of said motor and to cause thereby said transactions to be entered in said record sheet in the successive line spaces thereof.

2. A register as described in claim 1 wherein said motor is a torque motor permitting said motor to be immobilized by said stopping means without deenergizing the motor and without overheating the motor.

3. A register for recording a series of transactions on successive line spaces of a record sheet, comprising a printing mechanism, a carriage adapted to support the record sheet in printing relation to said printing mechanism, a drive for said carriage comprising a motor of the torque type and a drive connection between said motor and said carriage, said drive moving said carriage to bring a selected line space of said record sheet in position to receive a printing impression from said mechanism, means for stopping said carriage against the driving action of said motor after the carriage has been moved from the position it had after recordation of the previous series of transactions, a series of manually operable line selector keys for controlling the stopping position of said carriage, whereby the initial position of said carriage for the printing of the first line of the series of transactions is predetermined, means for operating said printing mechanism through successive cycles, escapement means for releasing said stopping means at recurrent periods in time relationship to said means for operating the printing mechanism to cause said carriage to move step by step by the drive action of said motor, and to cause thereby said transactions to be entered in said record sheet in the successive line spaces thereof, a resistor normally out of the circuit of said motor, and means automatically operable after the carriage has been stopped in said initial position for placing said resistor into the circuit of said motor whereby the power for driving said motor is reduced during the step by step operation of said carriage after said carriage has reached said initial position.

4. A register for recording on a selected line space of a record sheet comprising a printing mechanism, a carriage adapted to support a record sheet in printing relation to said printing mechanism, means for stopping said carriage and including a fixed stop for said carriage, a series of line selector keys on said carriage for movement therewith and each carrying a stop engaging member normally out of position to engage said stop when the corresponding key is inoperative and each moved into position to engage said stop when the corresponding key is shifted into operative position, means for automatically moving said carriage initially in one predetermined direction and means for reversing the movement of said carriage after reaching the limit of its movement in said direction.

5. A register for recording on a selected line space of a record sheet, comprising a printing mechanism, a carriage adapted to support a record sheet in printing relation to said printing mechanism, a drive for said carriage comprising a reversible motor, two alternate circuits for said motor, one causing the motor to operate in one direction and the other causing the motor to operate in the opposite direction, and a drive connection between said motor and said carriage, a series of line selector keys on said carriage for movement therewith, and each carrying a stop engaging member normally out of position to engage said stop when the corresponding key is inoperative and each moved into position to engage said stop when the corresponding key is shifted into operative position, means for automatically connecting said motor into one of said circuits for beginning of a registering operation to move said carriage initially in one predetermined direction, means including a limit switch at the end of the travel of said carriage in said direction for shifting the motor from said one circuit to the other circuit, when the stop engaging member of the shifted key is in position to move away from said fixed stop while said carriage is moving in said predetermined direction for reversing said motor and causing said carriage to move in the opposite direction until the stop engaging member of the shifted key engages said stop.

6. A machine for registering a series of transactions comprising a recording mechanism, a carriage for supporting a record sheet with lines in position to receive a recording impression from said recording mechanism, line selector keys corresponding to the lines respectively on the record sheet, means responsive to the shift of anyone of said keys for stopping said carriage in position to locate said record sheet with the line corresponding to the shifted key in recording position, means for actuating said recording mechanism through successive cycles, means for automatically moving said carriage step by step from initially stopped position in time relation with said cycles to positions to record said transactions on successive lines of the record sheet from the first key selected line thereon, and means automatically operable when the carriage reaches a limiting position in its step by step movement corresponding to the position where the line of said record sheet close to the last line reaches recording position for automatically stopping the machine.

7. A machine as described in claim 6 wherein means are provided for ejecting the record sheet automatically when the carriage reaches said limiting position.

8. A register for recording a transaction on a line space of a record sheet, comprising a printing mechanism and means to operate the same, a carriage adapted to support a record sheet in printing relation to said printing mechanism, a motor drive for said carriage, a series of manually operable line selector keys for controlling the stopping position of said carriage, whereby the initial position of said carriage for the printing of the first line is predetermined, signal means, and means automatically operable upon failure to actuate a selector key for activating said signal means.

9. A register as described in claim 8, wherein said signal means comprises a signal lamp and a normally open limit switch in said circuit in position to be closed by the carriage when said carriage reaches one end of the travel of said carriage to light said signal lamp.

References Cited by the Examiner

UNITED STATES PATENTS

| | | | |
|---|---|---|---|
| 1,761,542 | 6/30 | Shipley | 101—96 X |
| 1,880,416 | 10/32 | Carroll | 101—96 |
| 2,080,649 | 5/37 | Breitling | 101—96 |
| 2,239,060 | 4/41 | Sloan | 101—69 |
| 2,290,871 | 7/42 | Freedman | 101—69 |
| 2,658,446 | 11/53 | Helsel | 101—69 |
| 2,662,473 | 12/53 | Lippert | 101—378 |
| 2,708,873 | 5/55 | Brown | 101—19 |

ROBERT E. PULFREY, *Primary Examiner.*

WILLIAM B. PENN, *Examiner.*